(12) United States Patent
Sun et al.

(10) Patent No.: US 10,735,279 B2
(45) Date of Patent: Aug. 4, 2020

(54) NETWORKING SERVICE LEVEL AGREEMENTS FOR COMPUTER DATACENTERS

(71) Applicant: Futurewei Technologies, Inc., Plano, TX (US)

(72) Inventors: Yan Sun, Santa Clara, CA (US); Wei Xu, Dublin, CA (US); Xiaofeng Yang, Pleasanton, CA (US); Zhi Liu, Beijing (CN); Zhe Fu, Beijing (CN); Jun Li, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 409 days.

(21) Appl. No.: 15/488,334

(22) Filed: Apr. 14, 2017

(65) Prior Publication Data

US 2018/0302299 A1 Oct. 18, 2018

(51) Int. Cl.
*H04L 12/24* (2006.01)
*H04L 29/08* (2006.01)
(Continued)

(52) U.S. Cl.
CPC ........ *H04L 41/5041* (2013.01); *G06F 9/5077* (2013.01); *H04L 29/08135* (2013.01);
(Continued)

(58) Field of Classification Search
CPC ............. H04L 5/0035; H04L 29/08135; H04L 29/08171; H04L 41/5003; H04L 41/5006;
(Continued)

(56) References Cited

U.S. PATENT DOCUMENTS 7,275,037 B2 9/2007 Lauer
8,310,931 B2 * 11/2012 Agrawal ................ H04L 45/02
370/235
(Continued)

FOREIGN PATENT DOCUMENTS

CN 103218260 A 7/2013
CN 106464522 A 2/2017
(Continued)

OTHER PUBLICATIONS

Yong Zhan et al. "DistributedNet: A Reasonable Pricing and Flexible Network Architecture for Datacenter", IEEE ICC 2014—Selected Areas in Communications Symposium, 6 pages. (Year: 2014).*

(Continued)

*Primary Examiner* — George C Neurauter, Jr.
(74) *Attorney, Agent, or Firm* — Vierra Magen Marcus LLP

(57) ABSTRACT

A service level agreement (SLA) system is provided for multi-tenant cloud computing to enable provisioning of computing instances for tenants with a networking SLA. A networking SLA may specify a bandwidth requirement, for example, between instances to be scheduled for a tenant in a datacenter. The SLA system evaluates nodes in the datacenter based on a remaining capacity of links associated with nodes implementing the networking SLA. A modular system is provided to enable integration of the SLA system into existing cloud computing infrastructures. The cloud management system may query the SLA system to determine nodes in the datacenter capable of meeting a networking SLA. The list may be ordered to indicate nodes having better capacity to fulfill the networking SLA. The cloud management system can utilize the ordered list of nodes in scheduling instance deployments for tenant requests.

10 Claims, 17 Drawing Sheets

(51) Int. Cl.
*G06F 9/50* (2006.01)
*G06F 9/455* (2018.01)

(52) U.S. Cl.
CPC ...... *H04L 41/5006* (2013.01); *H04L 41/5019* (2013.01); *H04L 41/5035* (2013.01); *H04L 67/10* (2013.01); *H04L 67/322* (2013.01); *G06F 2009/4557* (2013.01); *H04L 41/0896* (2013.01); *H04L 41/12* (2013.01)

(58) Field of Classification Search
CPC ............... H04L 41/5009; H04L 41/501; H04L 41/5016; H04L 41/5019; H04L 41/5022; H04L 41/5025; H04L 41/5029; H04L 41/5032; H04L 41/5035; H04L 41/5038; H04L 47/783; H04L 47/788; H04L 47/805; H04L 47/822; H04L 47/827; G06F 9/45558; G06F 2009/4557; G06F 9/5061; G06F 9/5066; G06F 9/5072; G06F 9/5077

See application file for complete search history.

(56) References Cited

U.S. PATENT DOCUMENTS

| | | | |
|---|---|---|---|
| 8,612,599 | B2 | 12/2013 | Tung et al. |
| 8,837,572 | B2 | 9/2014 | Chen et al. |
| 8,902,755 | B2* | 12/2014 | Agrawal ............... H04L 45/02 370/235 |
| 8,971,451 | B2 | 3/2015 | Chen et al. |
| 9,172,577 | B2 | 10/2015 | Abdoli et al. |
| 9,274,750 | B2 | 3/2016 | Sun et al. |
| 9,401,851 | B2 | 7/2016 | Kakadia et al. |
| 9,575,794 | B2* | 2/2017 | Wang ................. G06F 9/45533 |
| 10,033,595 | B2* | 7/2018 | Sif ...................... G06F 9/45558 |
| 10,191,778 | B1* | 1/2019 | Yang ..................... G06F 9/5055 |
| 2003/0058797 | A1 | 3/2003 | Izmailov et al. |
| 2009/0287809 | A1 | 11/2009 | Chen et al. |
| 2010/0077449 | A1 | 3/2010 | Kwok et al. |
| 2010/0319004 | A1 | 12/2010 | Hudson et al. |
| 2011/0258317 | A1 | 10/2011 | Sinha et al. |
| 2012/0239850 | A1 | 9/2012 | Qiu et al. |
| 2013/0007234 | A1 | 1/2013 | Bartfai-Walcott et al. |
| 2013/0223238 | A1 | 8/2013 | Hobbs et al. |
| 2013/0297770 | A1 | 11/2013 | Zhang |
| 2014/0098673 | A1 | 4/2014 | Lee et al. |
| 2014/0189092 | A1 | 7/2014 | Zhang |
| 2014/0258535 | A1 | 9/2014 | Zhang |
| 2014/0297733 | A1 | 10/2014 | Wang et al. |
| 2015/0063166 | A1 | 3/2015 | Sif et al. |
| 2015/0281004 | A1 | 10/2015 | Kakadia et al. |
| 2015/0295849 | A1 | 10/2015 | Xia et al. |
| 2015/0302020 | A1* | 10/2015 | Westerman ........... G06F 16/128 707/639 |
| 2015/0319098 | A1* | 11/2015 | Nachum ............. H04L 12/6418 370/392 |
| 2016/0191344 | A1 | 6/2016 | Bartfai-Walcott et al. |
| 2016/0218948 | A1* | 7/2016 | Djukic ................ H04L 43/0876 |
| 2016/0323880 | A1 | 11/2016 | Luo et al. |
| 2016/0330138 | A1* | 11/2016 | Thomason .............. H04L 67/10 |
| 2017/0054801 | A1* | 2/2017 | Beereddy ................ H04L 47/70 |
| 2017/0171245 | A1* | 6/2017 | Lee ........................ G06F 16/86 |
| 2017/0317901 | A1* | 11/2017 | Agrawal ................. H04L 43/08 |
| 2018/0069944 | A1* | 3/2018 | Yang .................... H04L 67/1095 |
| 2018/0084081 | A1* | 3/2018 | Kuchibhotla ....... H04L 41/0816 |
| 2019/0109768 | A1* | 4/2019 | Senarath ............... H04W 48/16 |

FOREIGN PATENT DOCUMENTS

| | | |
|---|---|---|
| WO | 2013165365 A1 | 11/2013 |
| WO | 2015028931 A1 | 3/2015 |

OTHER PUBLICATIONS

Haiying Shen and Zhuozhao Li. "New Bandwidth Sharing and Pricing Policies to Achieve a Win-Win Situation for Cloud Provider and Tenants", IEEE Transactions on Parallel and Distributed Systems, vol. 27, No. 9, Sep. 2016, 16 pages. (Year: 2016).*
Jeffrey C. Mogul and Lucian Popa. "What We Talk About When We Talk About Cloud Network Performance", ACM SIGCOMM Computer Communication Review, vol. 42, No. 5, Oct. 2012, 5 pages. (Year: 2012).*
Benson, Theophilus, et al., "Network traffic characteristics of data centers in the wild," Proceedings of the 10th ACM SIGCOMM Conference on Internet Measurement, Nov. 2010, 14 pages.
Wang, Xiang, et al., "Livecloud: A lucid orchestrator for cloud datacenters," IEEE 4th International Conference on Cloud Computing Technology and Science (Cloudcom), Dec. 2012, pp. 341-348.
Koponen, Teemu, et al., "Network virtualization in multi-tenant datacenters," 11th USENIX Symposium on Networked Systems Design and Implementation (NSDI 14), Apr. 2014, pp. 203-216.
Shivappa, Vikas, "Introduction to Cache Quality of service in Linux Kernel," [http://events.linuxfoundation.org/sites/events/files/slides/presentlinuxcon_vikas_0.pdf], Aug. 2015, 32 pages.
Rosen, Rami, "Linux containers and the future cloud," Linux Journal, Jun. 2014, [downloaded from http://www.linuxjournal.com/content/linux-containers-and-future-cloud], 11 pages.
Docker.com, downloaded from [http://www.docker.com/products/docker-swarm] on Feb. 27, 2017, 7 pages.
Kubernetes.com, downloaded from [http://kubernetes.io/] on Feb. 27, 2017, 7 pages.
Amazon Web Services, downloaded from [https://aws.amazom.com/ecs/] on Feb. 27, 2017, 10 pages.
Microsoft Azure, downloaded from [https://azure.microsoft.com/en-us/services/container-service/] on Feb. 27, 2017, 9 pages.
Microsoft Azure, downloaded from [https://azure.microsoft.com/en-us/documentation/articles] on Feb. 27, 2017, 1 page.
Alizadeh, Mohammad, et al., "Less is more: trading a little bandwidth for ultra-low latency in the data center," 9th USENIX Symposium on Networked Systems Design and Implementation (NSDI 12), Apr. 2012, 14 pages.
Openstack, downloaded from [https://www.openstack.org] on Feb. 27, 2017, 9 pages.
Greenberg, Albert, et al., "VI2: a scalable and flexible data center network," in ACM SIGCOMM Computer Communication Review, vol. 39, Aug. 2009, pp. 51-62.
Mudigonda, Jayaram, et al., "Netlord: a scalable multi-tenant network," in ACM SIGCOMM Computer Communication Review, vol. 41, 2011, pp. 62-73.
Congdon, Paul, "Link layer discovery protocol," Technical Report, RFC 2922, Mar. 2002, 20 pages.
PCT/CN2018/082753, ISR, dated Jun. 27, 2018, 9 pages.
Supplementary European Search Report dated Jan. 3, 2020, in European Patent Application No. EP18784653, 8 pages.
CN 201880021243—Office Action dated Mar. 26, 2020, 11 pages.

* cited by examiner

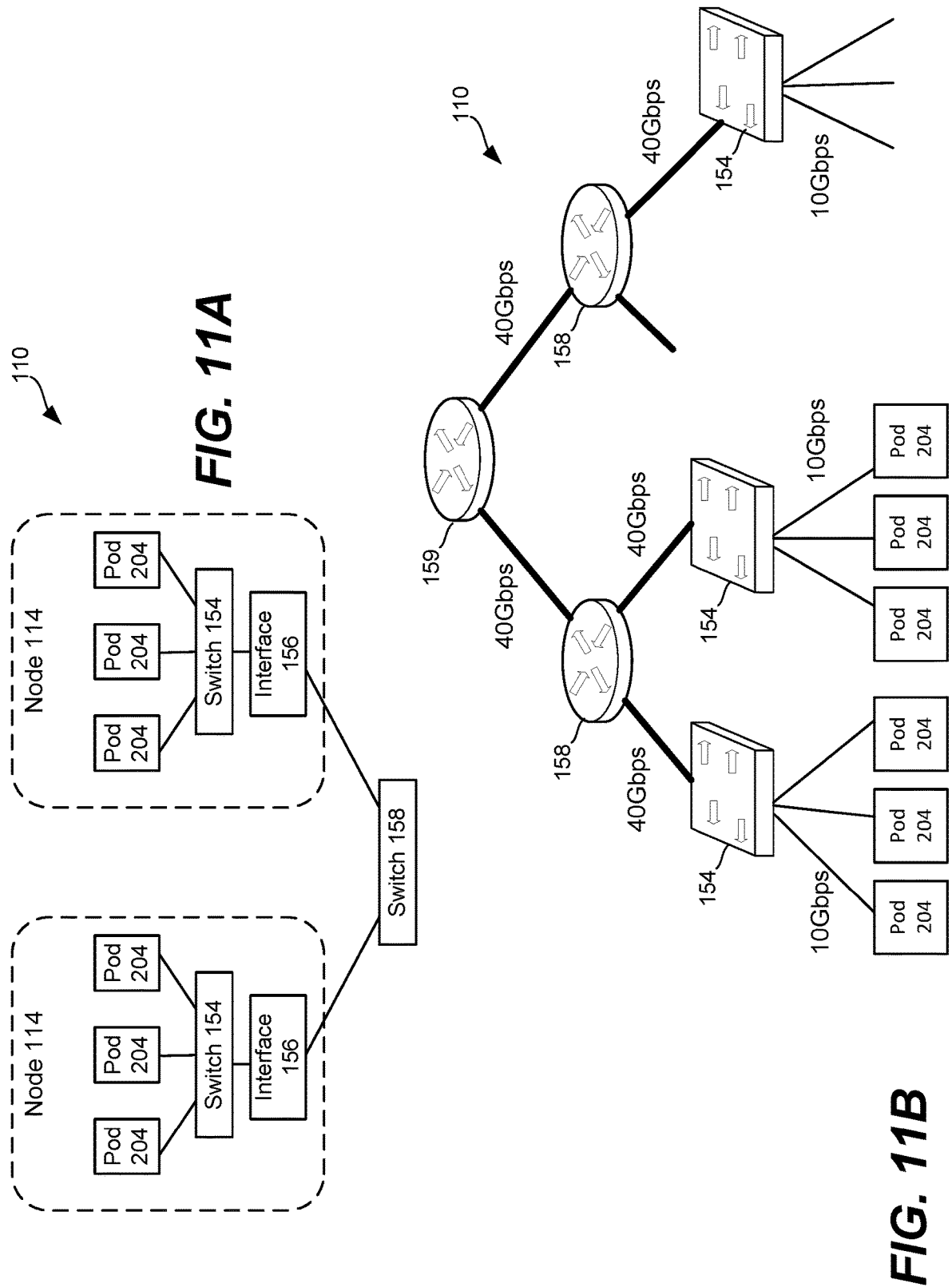

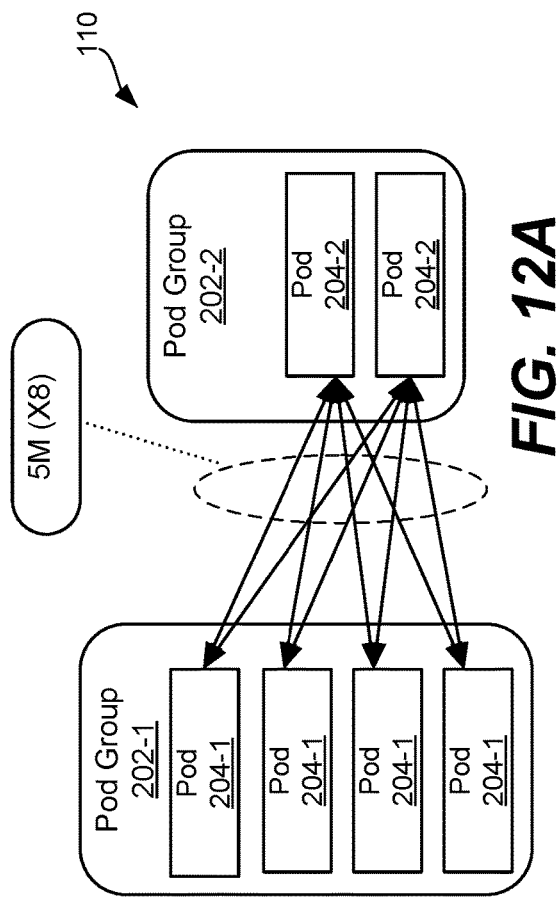
FIG. 12A
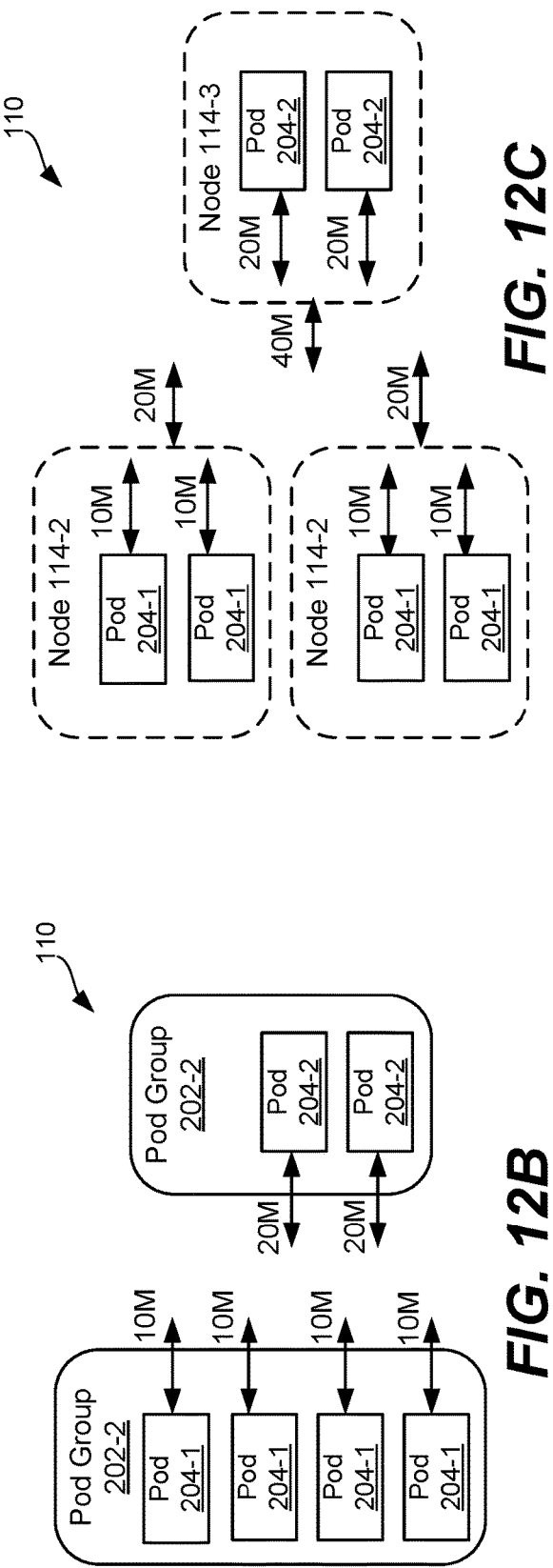
FIG. 12B
FIG. 12C
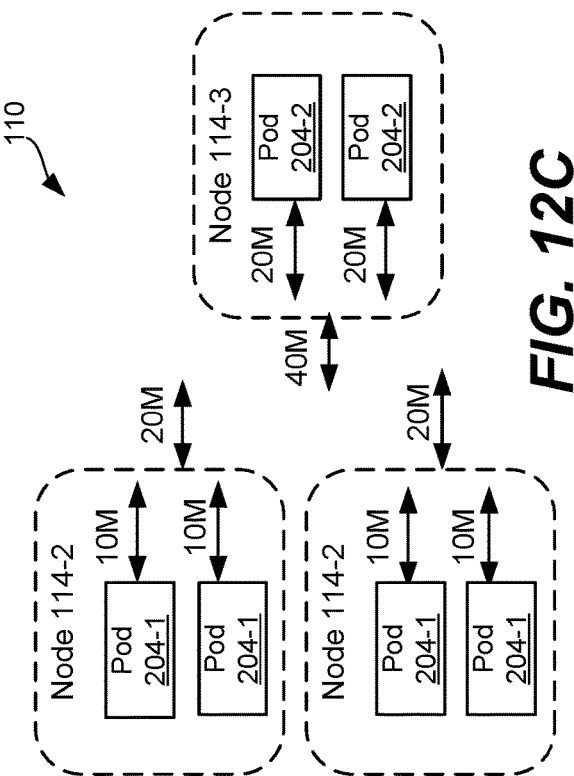

NETWORKING SERVICE LEVEL AGREEMENTS FOR COMPUTER DATACENTERS

BACKGROUND OF THE INVENTION

Cloud computing has emerged as a preferred technology for providing computing services. Cloud computing utilizes datacenters include hardware such as processor-based servers that serve as hosts to deliver computing resources as a service, rather than as a product. Users access computer resources such as a central processing unit, memory, storage, etc. by requesting services from the cloud computing system. This permits users to access computer resources without having to purchase and provision the appropriate hardware and software to provide the computing services. End users may access cloud-based services such as virtual machines or applications using client devices such as mobile devices, laptops, desktops, etc.

Modern cloud computing datacenters utilize many technologies to flexibly provide robust computing services to many users. Cloud computing often uses shared resources over one or more networks to provide shared services. Virtualization technologies, for example, permit physical computing resources such as processors, memory, and storage, etc. to be virtualized and divided to provide multiple instances of services from the datacenter. These architectures may be referred to as multi-tenancy cloud architectures where the datacenter provides services to multiple tenants.

Provisioning resources in large-scale datacenters has always been a challenge, particularly in multi-tenancy cloud architectures. The resources allocated to each tenant are to be isolated from all other tenants, even when the resources are located within the same computing device, such as the same physical server. At the same time, multiple instances provisioned for the same tenant are to be interconnected as if located in the same subnet.

SUMMARY

According to one aspect of the present disclosure, there is provided a device that includes: a non-transitory memory storage comprising instructions; and one or more processors in communication with the memory, wherein the one or more processors execute the instructions to: receive a networking service level agreement (SLA) associated with deploying a plurality of instances of computing services in a computing datacenter, the networking SLA specifying a bandwidth requirement between at least two of the instances; receive from a set of nodes in the datacenter a set of offers indicating initial network resources associated with the corresponding node; determine for the set of offers available network resources associated with meeting the SLA using the set of nodes; and deploy the plurality of instances at a subset of nodes of the computing datacenter based on the available network resources associated with the set of offers.

Optionally, in any of the preceding aspects, the subset of nodes is a second subset of nodes; the one or more processors execute the instructions to perform a first deployment of the plurality of instances at a first subset of nodes in the computing datacenter prior to determining the available network resources; and the one or more processors execute the instructions to deploy the plurality of instances at the second subset of nodes in the computing datacenter based on the available network resources after the first deployment, the second subset of nodes including at least one different node from the first subset of nodes.

Optionally, in any of the preceding aspects, the one or more processors execute the instructions to monitor the first deployment at the first subset of nodes to determine whether the networking SLA is satisfied; wherein the plurality of instances are deployed at the second subset of nodes based one the first deployment not being satisfied.

Optionally, in any of the preceding aspects, the one or more processors execute the instructions to: deploy a first QoS rule(s) for enforcement across one or more pods; deploy a second QoS rule(s) for enforcement across one or more virtual machines; and deploy a third QoS rule(s) for enforcement across one or more physical machines.

Optionally, in any of the preceding aspects, the one or more processors execute the instructions to: determine available virtual network resources between instances in one physical machine to meet the bandwidth requirement using each offer; and determine available physical network resources between instances in different physical machines to meet the bandwidth requirement using each offer.

Optionally, in any of the preceding aspects, the offer from each node includes an indication of initial bandwidth available at the node; and the one or more processors execute the instructions to determine for the set of offers the available network resources by deducting the bandwidth requirement from the initial bandwidth at each node.

Optionally, in any of the preceding aspects, the processor executes the instructions to: determine for a plurality of offers including the set of offers a distance between interconnected instances of the plurality; determine for the set of offers a remaining capacity of each link between interconnected pods after deducting the bandwidth requirement; and generate an ordered list of the set of offers based on the distance and the remaining capacity of each link; wherein deploying the plurality of instances is based on the ordered list.

Optionally, in any of the preceding aspects, the processor sorts the plurality of offers based on the distances between interconnected instances; and the processor evaluates the plurality of offers by evaluating lower distance offers before higher distance offers in order to select a predetermined number of offers for the set that have enough network resources to meet the bandwidth requirement.

Optionally, in any of the preceding aspects: the networking SLA and the set of offers are received at a cloud management system; the one or more processors execute the instructions to transmit the plurality of offers to a service level agreement (SLA) system; the one or more processors execute the instructions to provide the ordered list from the SLA system to the cloud management system; and the plurality of instances are deployed by the cloud management system based on the ordered list.

Optionally, in any of the preceding aspects: the networking SLA specifies a latency requirement and a drop rate requirement; the ordered list is generated based on the latency requirement and the drop rate requirement; the one or more processors execute the instructions to receive a computing SLA associated with deploying the plurality of instances; and the one or more processors execute the instructions to deploy the plurality of instances based on the computing SLA and the ordered list.

Optionally, in any of the preceding aspects: the networking SLA is associated with deploying a plurality of containers, each container including one or more of the instances of computing services.

Optionally, in any of the preceding aspects: the networking SLA is associated with deploying a plurality of pods, each pod including two or more of the containers.

According to one aspect of the present disclosure, there is provided a method that includes: receiving a bandwidth requirement in association with a deployment of a plurality of instances of computing services at a computing datacenter; receiving from a plurality of nodes in the computing datacenter a plurality of indications of initial bandwidth available at the plurality of nodes; determining for the plurality of nodes a distance between interconnected instances of the plurality; determining for at least a portion of the plurality of nodes a remaining capacity of links between interconnected instances based on the indications of initial bandwidth and the bandwidth requirement; and deploying the plurality of instances at a subset of the set of nodes based on the distances between interconnected instances and the remaining capacity of links between the interconnected instances.

Optionally, in any of the preceding aspects, the plurality of instances is a plurality of pods; the plurality of nodes is a plurality of virtual machines, the plurality of virtual machines provided at one or more physical machines including a physical processor and physical memory; the links between interconnected instances include a first set of links including links between pods in one physical machine and a second set of links including links between pods in different physical machines; and determining a remaining capacity of links between interconnected instances includes determining available virtual network resources and determining available physical network resources.

Optionally, in any of the preceding aspects, the method further includes: sorting the plurality of nodes based on the distance between interconnected instances; selecting a set of nodes from the plurality based on the distance between interconnected instances and the indications of initial bandwidth, the set of nodes including less than the plurality of nodes; determining the remaining capacity for the set of nodes; and generating an ordered list of the set of nodes based on the remaining capacity of the links between interconnected instances; wherein deploying the plurality of instances at the subset of nodes is based on the ordered list.

According to one aspect of the present disclosure, there is provided a non-transitory computer-readable medium storing computer instructions for computer datacenter management, that when executed by one or more processors, cause the one or more processors to perform the steps of: receive a request to deploy a plurality of pods in a computing datacenter based on a service level agreement (SLA) specifying a bandwidth requirement between two or more of the pods; receive from a set of nodes in the computing datacenter an indication of initial bandwidth associated with each of the nodes; determine for the set of nodes a remaining bandwidth associated with each node based on the indication of initial bandwidth and the bandwidth requirement; and schedule the plurality of pods at a subset of nodes from the set based on the remaining bandwidth of each node.

Optionally, in any of the preceding aspects: the request is received at a network management system; the indication of initial bandwidth is received at an SLA management system from an agent at each of the set of nodes; the remaining bandwidth associated with each node is determined by the SLA management system, wherein the remaining bandwidth indicates a remaining capacity of a most congested link associated with each node; and the instructions cause the one or more processors to perform the step of provide an ordered list of nodes based on a remaining bandwidth of each node, the ordered list is provided from the SLA management system to a cloud management system.

Optionally, in any of the preceding aspects, the instructions cause the one or more processors to perform the steps of: determine for a plurality of nodes including the set of nodes a distance between interconnected pods of the plurality; and generate the ordered list of the subset of nodes based on the remaining bandwidth and the distance between interconnected pods.

Optionally, in any of the preceding aspects, the instructions cause the one or more processors to perform the steps of: sort the plurality of nodes based on the distance between interconnected pods; and determine the set of nodes from the plurality of nodes by evaluating the plurality of nodes to select a predetermined number of nodes that have an initial bandwidth that meets the bandwidth requirement; wherein the plurality of nodes is evaluated by evaluating lower distance nodes before higher distance nodes such that the remaining bandwidth is determined for less than all of the plurality of nodes.

Optionally, in any of the preceding aspects, the instructions cause the one or more processors to perform the step of: deploy one or more quality of service rules at the subset of nodes based on the bandwidth requirement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIGS. 11A-11B depict a portion of a computing datacenter and a process of determining network resources to meet a networking SLA in accordance with one embodiment.

FIGS. 12A-C are block diagrams depicting reservation of bandwidth at computing nodes of a datacenter in accordance with one embodiment.

DETAILED DESCRIPTION

Figure 1:
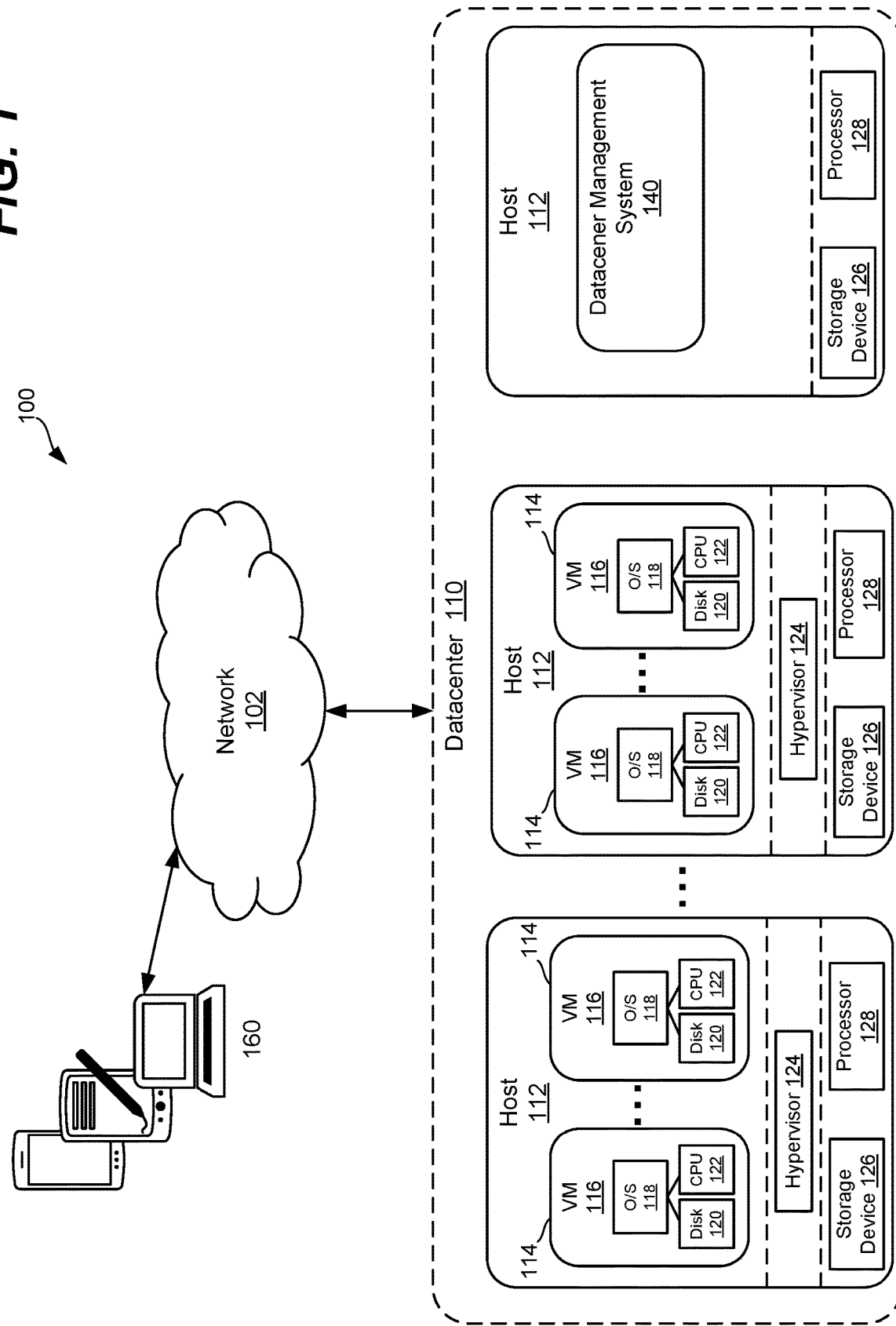
FIG. 1 is a block diagram of a network environment including a computing datacenter.

The disclosure relates to technology for computer datacenter management, such as a datacenter management system for managing the resources of a cloud infrastructure. A cloud infrastructure may include a datacenter having many physical host devices, as well as numerous virtual machines and/or other virtualizations of underlying physical computer resources. Typically, cloud management systems leverage server virtualization technologies that enable fine-grain slicing and allocation of physical resources such as central processing unit (CPU), memory, and disk. Networking components of cloud computing are addressed by software-defined networking techniques including its typical application, network virtualization.

Traditionally, cloud computing service level agreements (SLA) have only addressed the physical computing resources of the cloud infrastructure. For example, computing resources such as CPU, memory, disk, cache, etc. may be provisioned with computing SLA's that reserve certain amounts of resources and ensure resource quality. While computing SLA's have addressed computing resources of cloud infrastructures, the networking resources of the cloud infrastructure are typically not constrained. In this manner, multiple tenants share networking resources such as bandwidth without restraints on, or guarantees to, individual tenants.

In accordance with one embodiment, a computer datacenter is provided with a multi-tenant infrastructure configured to provision resources to tenants based on networking service level agreements. A service level agreement (SLA) system is provided for a computer datacenter that enables provisioning of computing instances with a networking SLA. A computing instance refers to one or more computing resources deployed at a computing node. An instance can include a virtualization of physical resources such as memory, computing capacity (e.g., one or more virtual cores or computing units), storage, and/or other physical infrastructure. An instance may also include software or code deployed at a computing node. Examples of instances include the virtualized physical resources and code (operating system and application(s) combination) to create an HTTP server (e.g., web file system), a database server, or any other computing service. A networking SLA may be provided that specifies a bandwidth requirement, for example, in association with cloud resources that are to be scheduled for a tenant. The SLA system evaluates nodes in the datacenter based on a remaining capacity associated with the node when a computing instance is deployed for the tenant request.

A modular networking SLA system is provided in one embodiment that enables integration of the SLA system into existing cloud computing infrastructures. The SLA system provides and utilizes a generalized application programming interface between the cloud management system and the SLA system. This permits the cloud management system to access the SLA system as part of scheduling computing instances at nodes in the datacenter. For example, the cloud management system may query the SLA system to determine a list of nodes in the datacenter capable of meeting a networking SLA specified by a tenant for deployment of computing instances. The list may be ordered to indicate nodes having better capacity to fulfill the networking SLA. The cloud management system can utilize the ordered list of nodes or offers as part of a process to determine where to deploy computing instances for the tenant request.

In one embodiment, SLA agents are deployed at nodes of the datacenter. The nodes generate offers to the SLA management system indicating networking resources available at the node. The offer may be generated in response to a particular tenant request or may be generated prior to a tenant request (e.g., periodically). In one example, the offer indicates an available bandwidth at the node. The SLA system receives the offers and evaluates the offers to generate the ordered list. The SLA system may consider physical resources and/or virtual resources involved in fulfilling a networking SLA. For example, the SLA system may consider traffic between nodes in one virtual machine, traffic between nodes in different virtual machines, and traffic between nodes in different physical machines.

In one embodiment, the SLA system provides multiple modes for deploying computing instances in response to a tenant request. In a passive mode, computing instances may be defined and deployed prior to evaluating the network resources to fulfill the networking SLA. After deployment, the network is monitored to determine if the networking SLA is met. If the networking SLA is not satisfied, the system may attempt instance relocations to attempt to meet the networking SLA. In a proactive mode, the system evaluates the network resource capabilities of the nodes to meet the SLA requirements prior to deploying the computing instances. The individual nodes are evaluated in order to select nodes based on the overall network ability to meet the networking SLA. A hybrid process is provided in one embodiment. The passive mode is used when the number of nodes having a minimum resource level is above a threshold. This enables fast deployments when the datacenter has large capacity. When the number of nodes is below the threshold, the proactive mode is used to decrease the probability of redeployments.

FIG. 1 illustrates a network environment 100 that provides a cloud infrastructure or cloud computing environment, permitting remote devices 160 to access computing services provided by a cloud computing datacenter 110. The datacenter can communicate with remote devices 160 via network 102 (including, e.g., the Internet). Although a single datacenter 110 is depicted in FIG. 1, multiple datacenters may be included in a cloud computing architecture. Each datacenter 110 may comprise a geographically-separated site that hosts hardware for supporting cloud-based systems. As such, the datacenter 110 may include multiple blades, servers, or other computer systems for providing computing nodes 114. The multiple datacenters may be managed by a datacenter management system at a single datacenter, by a system at each datacenter, or by a combination of the two.

Datacenter 110 may comprise a storage cluster having computer nodes 114 interconnected with each other by a network (not shown). Datacenter 110 may include hosts 112, each comprising a physical machine such as a server coupled to network 102. Each physical machine 112 includes a hardware layer containing one or more processors (e.g., CPU) 128 and one or more storage devices (e.g., disk) 126. The storage devices can include optical disk storage, RAM, ROM, EEPROM, flash memory, phase change memory, magnetic cassettes, magnetic tapes, magnetic disk storage or any other computer storage medium which can be used to store the desired information and be accessed by processor 128. The hardware layer may include other components such as buses, etc. (not shown) typically used to implement a computing device as hereinafter described.

Each host 112 includes a plurality of computing nodes 114 that provide computing services. In this example, each computing node comprises a virtual machine 116. The virtual machines 116 may be a system virtual machine (e.g., full virtualization), a process virtual machine (in a platform independent environment), or any other type of virtual machine. The virtual machines execute on a respective host (e.g., server).

A hypervisor 124 (or virtualization manager) is provided in a virtualization layer to allocate and manage access to a number of physical resources in the hardware layer such as storage device 126 and processor 128. Virtual machines 116 executing in the virtualization layer may access the physical resources via hypervisor 124.

A virtualization layer is configured to create and manage virtual machines 116 and provide other services to customers using the physical resources in the cloud. The virtualization layer includes, for example, one or more operating systems 118 and virtual resources allocated to the one or more operating systems 118. Virtual resources may include, but are not limited to, virtual disks 120 and virtual processors 122, as well as virtual resources such as virtual memory and virtual network interfaces. The virtual resources and the operating system 118 may together be referred to as the virtual machine 116. Each virtual machine 116 may be in communication with the hypervisor 124 and be used to execute applications for managing and configuring other virtual machine s 114 on the hosts.

In one embodiment, one or more host computing devices 112 are configured with a datacenter management system 140 which provides interfaces through which cloud operators and cloud customers may interact with the cloud computing environment 100. For example, the management system 140 may provide a set of APIs and/or one or more web-based or standalone applications with user interfaces to allow cloud operators to manage the cloud resources, configure the virtualization layer, manage customer accounts, and perform other cloud administration tasks. The management system 140 also may include a set of APIs and/or one or more web-based or standalone applications with user interfaces configured to receive cloud computing requests from end users via remote devices 160, for example, requests to create, modify, or destroy virtual machines within the cloud.

In response to client requests, the management system may select and provision physical resources in the hardware layer of the cloud computing environment 100 based on the client requests. For example, the management system 140 may be configured to create and manage virtual machines 116 and their operating environments for users of remote devices 160 over a network (e.g., the Internet), providing users with the ability to provision virtual machines 116.

The remote devices 110 represent any suitable end user device and may include such devices (or may be referred to) as a user equipment/device (UE), mobile wireless communication device, wireless transmit/receive unit (WTRU), mobile station, fixed or mobile subscriber unit, pager, cellular telephone, personal digital assistant (PDA), smartphone, laptop, computer, touchpad, or consumer electronics device. The remote devices 160 may have a processor, a memory (which may or may not be non-transitory), a transceiver, and an antenna (not shown). In particular embodiments, some or all of the functionality described herein as being provided by the remote device may be provided by the remote device processor executing instructions stored on the memory. Alternative embodiments of the remote device may include additional components that may be responsible for providing certain aspects of the remote device's functionality, including any of the functionality necessary to support the embodiments of the present disclosure.

The network 102 may comprise any private or public network for facilitating communications between various components of the network 102. In various embodiments, the network 102 may include the Internet, a PSTN or any area network, such as a LAN, WAN, WLAN and the like. It will be apparent that, while the various components are illustrated as being directly connected to the network 102, various intermediate devices such as routers and switches (not shown) may facilitate such connections It is appreciated that FIG. 1 is an example of a network architecture that may be used, and those of skill in the art will appreciate that the specific network architecture and data processing devices used may vary, and are secondary to the functionality that they provide, as further described herein.

Figure 2:
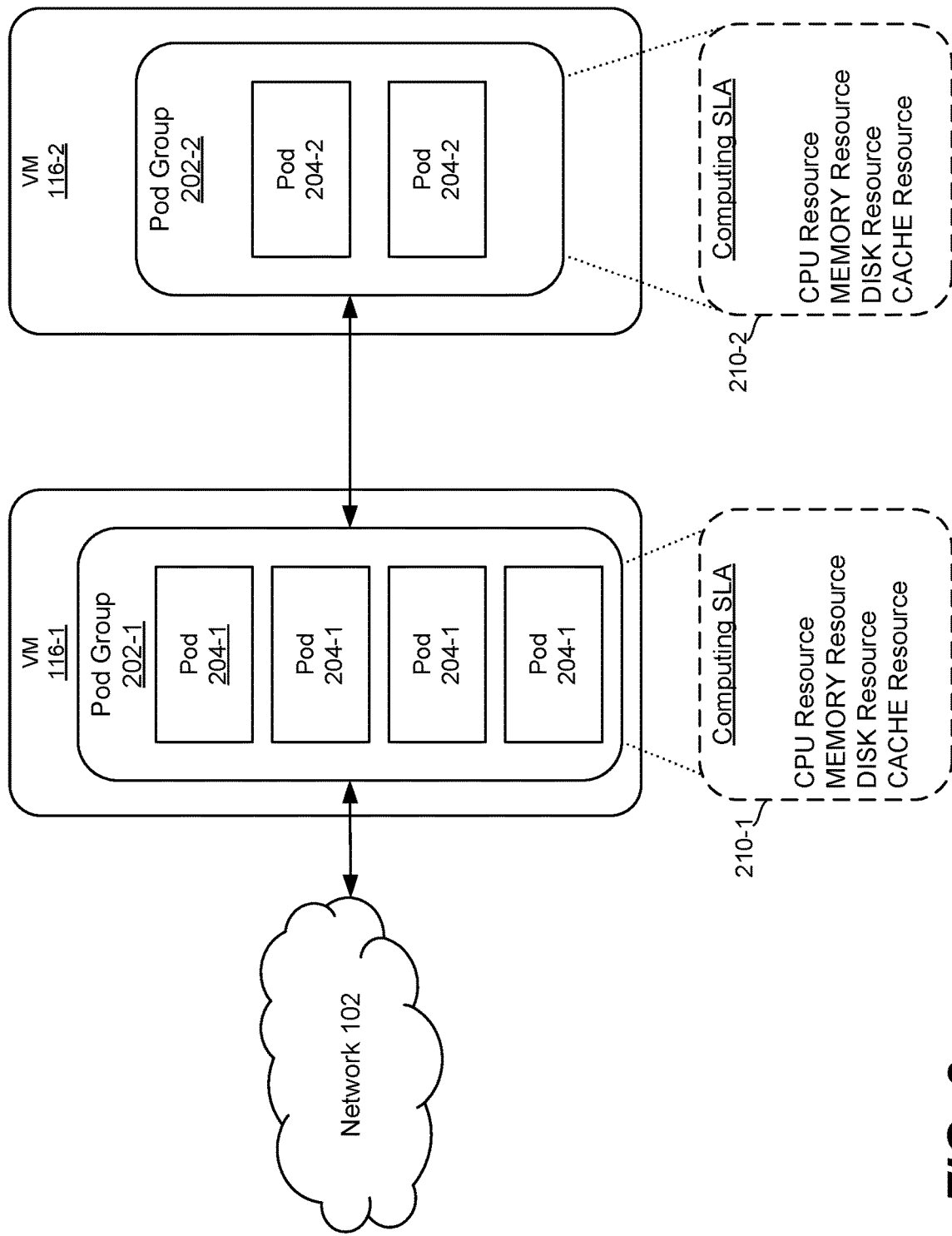
FIG. 2 is a block diagram depicting a computing service level agreement (SLA) implementation for pod groups in a computing datacenter.

FIG. 2 is a block diagram depicting an example deployment of cloud resources in response to a user request. In the simplified example, a customer requests the deployment of two pod groups 202-1 and 202-2 in the datacenter 110. Pod group 202-1 includes four pods 204-1 which are configured to provide a common computing service. For example, each pod 204-1 may be configured as a web server or web service having common web functionality with each other pod 204-1 in pod group 202-1. Each pod 204-2 in the second pod group 202-2 may be configured as a database server or database service having a common database functionality with each other pod 204-2 in pod group 202-2. It is noted that the number and type of pods and pod groups is provided by way of example only. Pods and pod groups may be configured for any type of computing service and with any number of groups or pods within a group. Additionally, the pods within a pod group may be distributed across multiple computing nodes, rather than at a single node as shown in FIG. 2.

Pods may be used for the deployment of instantiations of computing services or applications. A pod will typically include one or more containers, computer resources (e.g., storage, memory) associated with the containers, and specifications regarding execution of the containers. Each pod in the pod group may run in a shared environment to provide a specific application service. Each pod may include shared namespaces and other isolations that isolate the pod from other pods.

Each container within a pod group provides a virtual instance of an application or other computer service. Typically, containers virtualize a single application unlike a virtual machine which may virtualize multiple applications. Containers create isolation between instances at the application level rather than the server level. Containers do not require their own operating system. In one example, a container includes the minimum amount of resources to perform their corresponding computer service, such as the code, libraries, and operating system pieces to run the computer service. The containers within a container group are tightly coupled, e.g., sharing common addresses space, port space, etc. The containers may communicate directly using standard process communications and shared memory. One example of a container is a docker container, but any container may be used. A docker container is a grouping of the system resources to run a piece of software at a computing node. A docker container can include application code, libraries, and other system resources to run the application in a complete filesystem.

Many cloud services are based on virtual machines and container technology including pod deployments. However, the present disclosure is not so limited and be applied in any datacenter framework where computing resources are shared by multiple tenants. For example, the present disclosure may be used with the deployment of instances of any computing service. In that respect, the term instance may be used to refer to a single deployment of an application for execution at a computing node. Additionally, the term instance may be used to refer to a container including an instance of an application and other computer resources for providing a computing service, a pod including one or more containers, and/or a virtual machine providing a computing service.

A computing SLA for each pod group is provided in FIG. 2. Computing SLA 210-1 provides a specification of computer resources that are to be allocated and reserved for the corresponding pod group 202-1. Similarly, computing SLA 210-2 provides a computer resource specification for pod group 202-2. Each computing SLA may specify computer resources for the pod groups, or for individual pods within the group. In this example, each computing SLA specifies a CPU resource, a memory resource, a disk resource, and a cache resource for the corresponding pod group. A tenant may provide the SLA specification with or as part of a request to deploy cloud resources on behalf of the tenant. The computing SLA is specific to a particular tenant's cloud deployment. Accordingly, multiple tenants may be provisioned using common physical resources, while reserving certain amounts of the resources for particular tenants.

While solutions like that depicted in FIG. 2 provide some management of the computer resources of a cloud infrastructure in a multi-tenant environment, the network resources including links between instances or pods within the infrastructure are not constrained by the computing SLA. The computing SLA does not address the networking resources utilized in deploying the requested services. As such, the multiple tenants are left to share the networking resources within the datacenter in an unrestrained manner. For example, the tenants have no guarantees or constraints on the physical bandwidth that may be used within the datacenter for their services.

Traditional cloud computing has focused on the computer resources such as CPU or memory under the assumption that network resources will in turn handle all necessary traffic. However, providing smaller based services such as container and pods has revealed that networking resources between computer resources reserved for a tenant can be vulnerable to congestion, resulting in decreased service levels being provided to the user. For example, containers may be deployed by multiple orders more than virtual machines for a single physical machine, making the networking resources more constrained.

To address the limitations of computing SLA's, the present disclosure provides a networking SLA framework within a cloud computing infrastructure. A networking SLA is provided that may specify networking requirements between computing resources deployed for a tenant within a multi-tenancy cloud. The tenant may provide the networking SLA with or as part of a request to deploy computer resources on behalf of the tenant. The networking SLA may specify a bandwidth requirement, a latency requirement, a drop rate requirement (a maximum number of packets that may be dropped in a period of time), and/or other networking requirements for computer resources for the corresponding tenant. The networking SLA may be specified as requirements between instances, containers, and/or pods within a tenant deployment.

Figure 3:
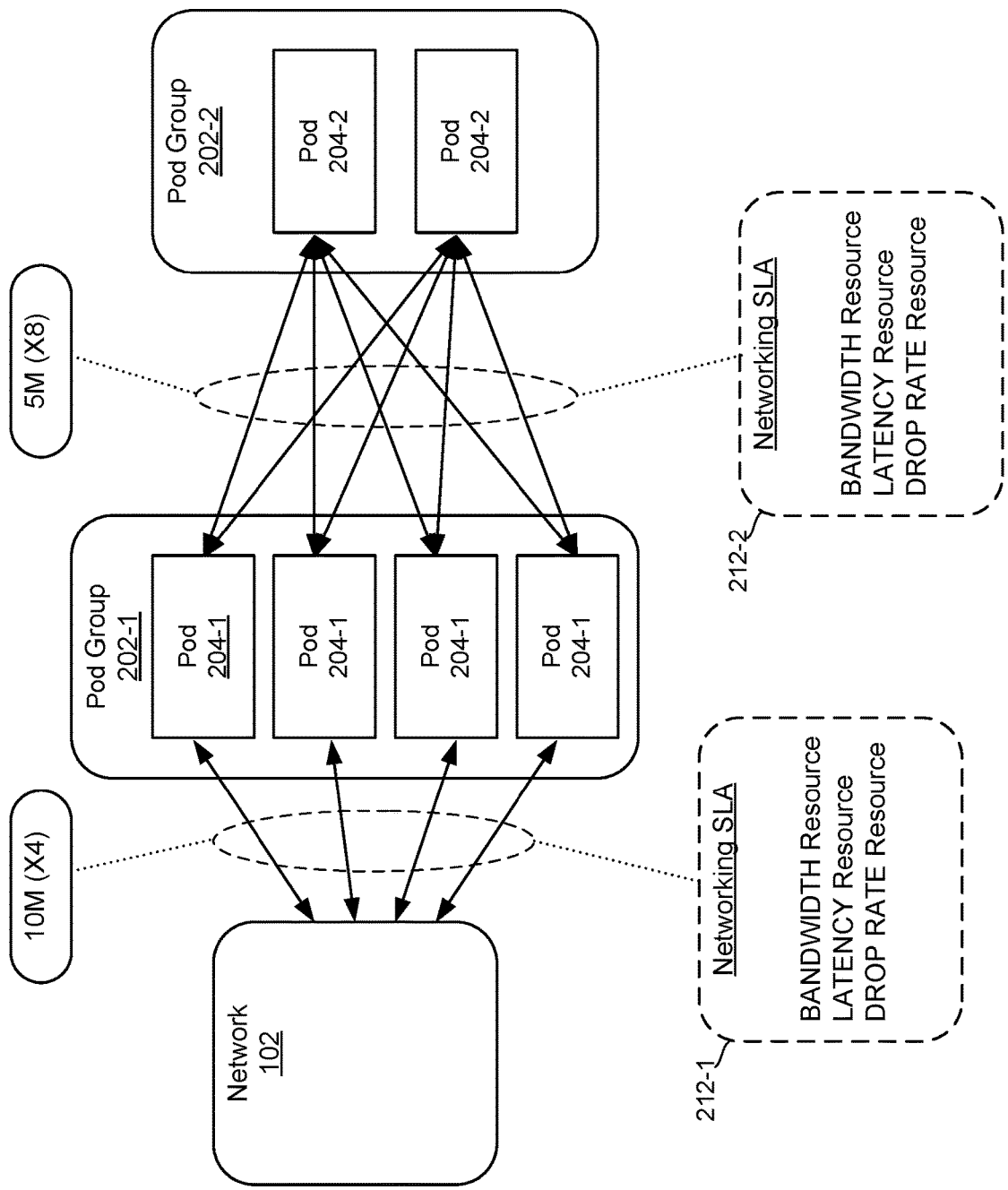
FIG. 3 is a block diagram depicting a networking SLA implementation for pod groups in a computing datacenter in accordance with one embodiment.

FIG. 3 is a block diagram depicting an example deployment of cloud resources for a tenant request, including a networking SLA specifying networking requirements between computer resources reserved for the request. FIG. 3 continues with the simplified example of FIG. 2, depicting pod groups 202-1 and 202-2 in datacenter 110. In FIG. 3, however, the tenant deployment of each pod group includes a networking SLA associated with the pod groups. In this example, a first networking SLA 212-1 is provided that specifies networking requirements between pod group 202-1 and the network 102. The first networking SLA 212-1 may specify a bandwidth resource, latency resource, and/or a drop rate resource for the links between each pod 204-1 and the internet. A bandwidth resource may specify a minimum bandwidth to be provided between computing instances such as pods. A latency resource may specify a maximum latency between instances. A drop rate resource may specify a maximum drop rate of packets between instances. A specific example is shown where the networking SLA specifies that each link between a pod 204-1 and internet 208 must reserve a bandwidth of 10 Mbits. Although each link is specified with the same bandwidth requirement, different links may include different requirements. For example, SLA-212-1 may specify requirements for each pod individually or for each pod within the pod group.

Similarly, a second networking SLA 212-2 is provided that specifies networking requirements between pod groups 202-2 and pod group 202-1. SLA 212-2 may specify a bandwidth requirement, latency requirement, and/or a drop rate requirement for the links between each pod in group 202-1 and each pod in group 202-2. A specific example is shown where the networking SLA specifies that each link between a pod 204-1 and pod 204-2 must reserve a bandwidth of 5 Mbits. Although each link is specified with the same bandwidth requirement, different links may include different requirements. For example, SLA-212-2 may specify requirements for each pod individually or for each pod within the pod group. This permits a certain amount of bandwidth to be reserved between computing services deployed for a particular tenant.

Although FIG. 3 depicts a specific example using pod, the same concept may be applied to containers or other instances of computing services deployed at nodes of a datacenter. For example, a container may be substituted for the pod to schedule the deployment of containers using the networking SLA.

Variations to SLA specifications can be used to address changing numbers of instances of services as can be expected in typical implementation. In one example, the bandwidth of the linking represents that an amount of bandwidth should be reserved between any pair of instances between services. In another example, the number of links represents an aggregated bandwidth between services. The bandwidth between instances in the second example can be determined by dividing the aggregated bandwidth equally among all instance pairs. Data-plane policy entries can be generated and enforced to appropriate switches in the cloud infrastructure.

Figure 4:
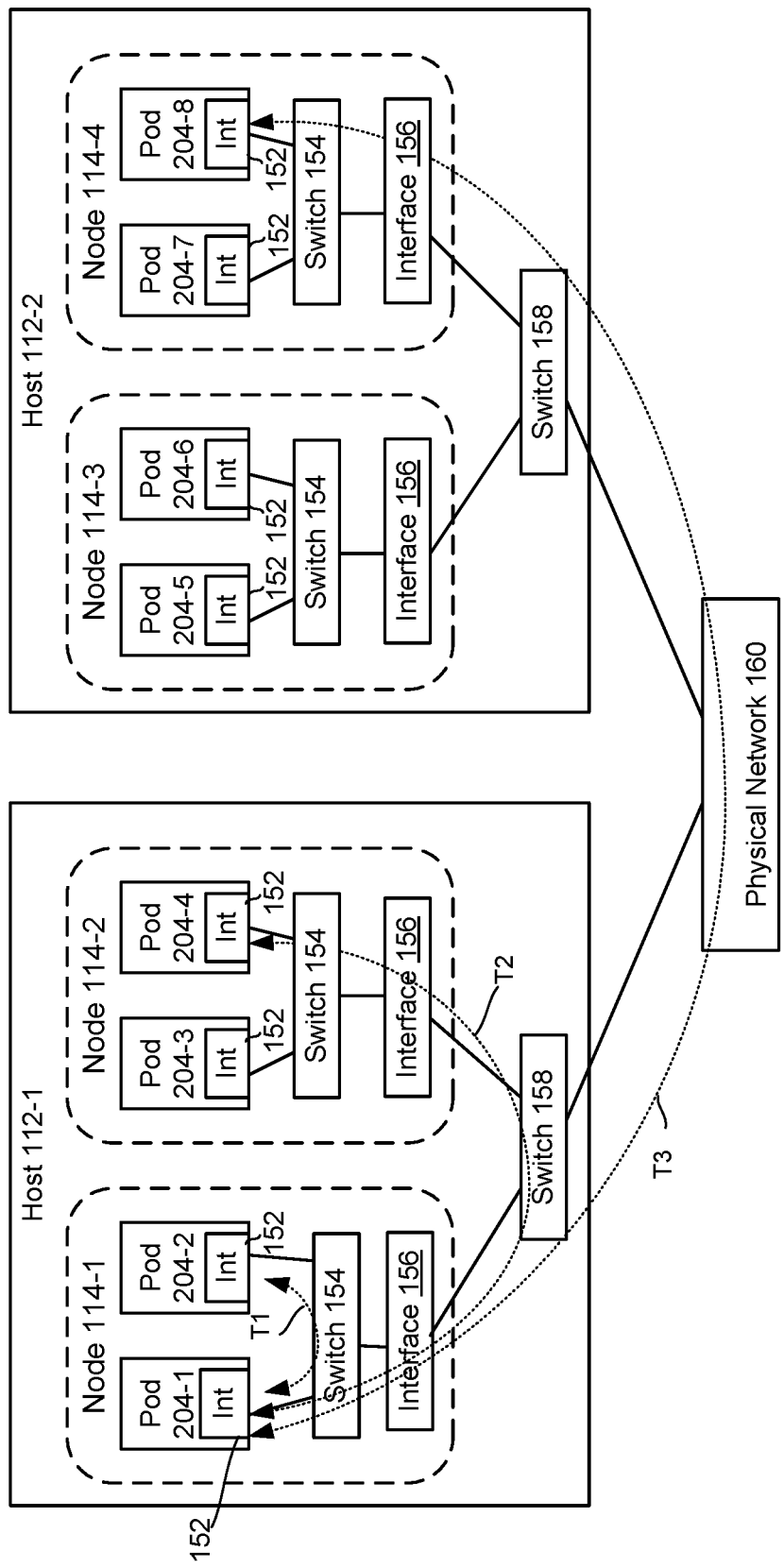
FIG. 4 is a block diagram of a computing datacenter including an SLA management system in accordance with one embodiment.

FIG. 4 is a block diagram depicting an example of a deployment of pods at nodes 114 within a datacenter. In this example, eight pods have been deployed across four nodes at two hosts 112-1 and 112-2. Each node can be, but is not required to be, its own virtual machine. FIG. 4 illustrates three types of traffic between the pods in the customer deployment. Traffic T1 represents a data path between pods 204-1 and 204-2 in a single node 114-1. In this example, traffic T1 passes from the interface 152 at a first pod 204-1, through a switch 154, and on to the other pod 204-2 via its interface 152. Thus, traffic T1 is within a single node 114-1.

Traffic T2 passes from the interface 152 at pod 204-1 in node 114-1, through a local switch 154 and interface 156, to a switch 158 which couples the node 114-1 to node 114-2 in the same physical host 112-1. From switch 158, traffic T2 passes through interface 156, switch 154, and through interface 152 to the second pod 204-4 in node 114-2 of host 112-1. Thus, traffic T2 passes between two nodes in the same physical host 112-1. Although not shown, traffic T2 may pass from a first VM at a first node 114-1 to a second VM at the second node 114-2.

Traffic T3 passes from the interface 152 at pod 204-1 to a pod 204-8 in a second physical host 112-2. Traffic T3 passes from switch 158 at host 112-1 through a physical network 160 to host 112-2. Physical network 160 may include additional interfaces and switches, for example. Thus, traffic T3 passes between two nodes in different hosts. Although not shown, traffic T3 may pass from a VM at the first node to a VM at the second node.

Figure 5:
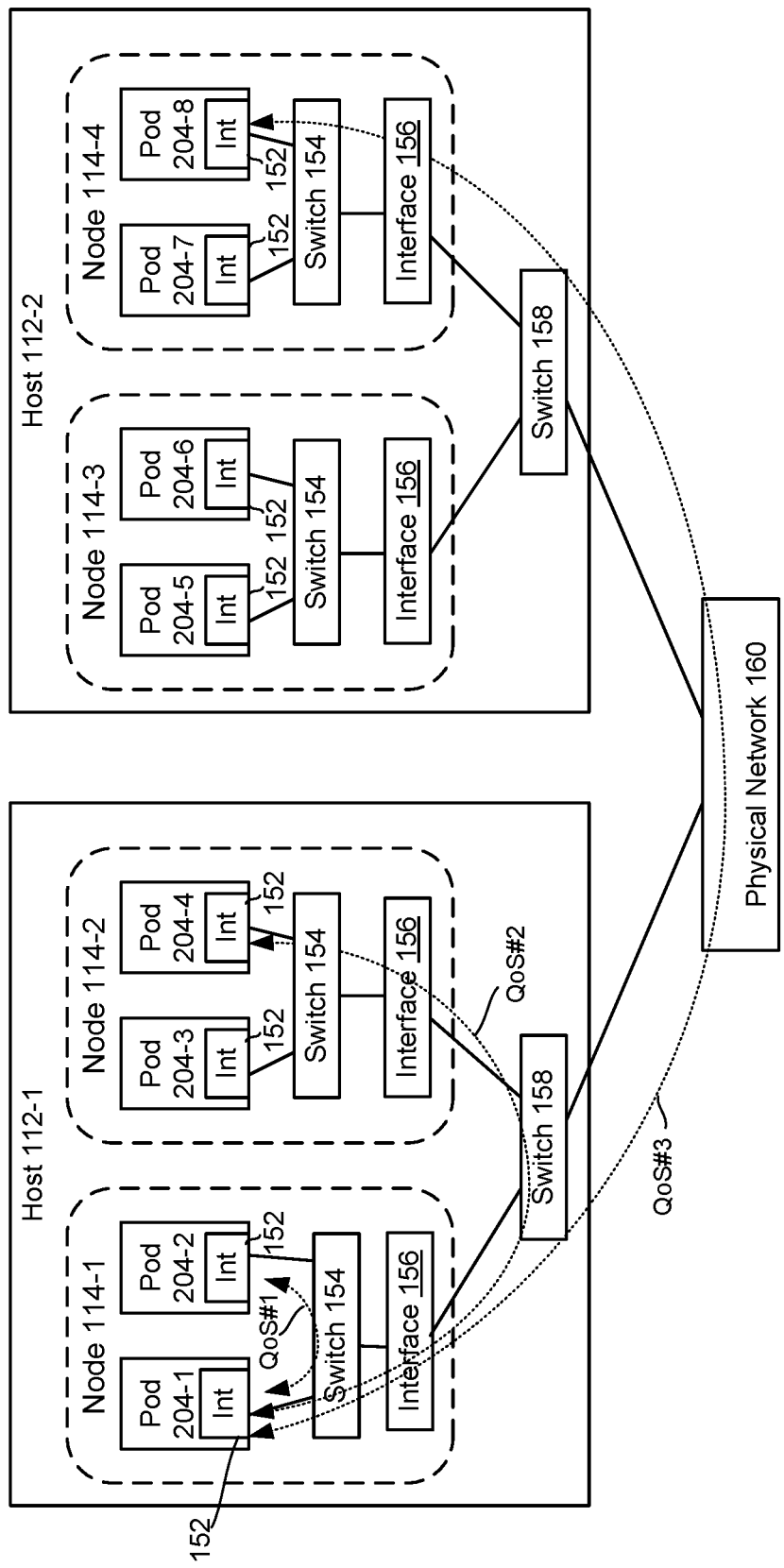
FIG. 5 is a block diagram of datacenter management cluster and computing node in a computing datacenter in accordance with one embodiment.

The networking SLA provided by a tenant request may specify a particular bandwidth between pods 204. To account for all three types of traffic that may occur, the SLA management system may provide quality of service (QoS) rules that are enforced for each type of traffic. Quality of service refers to the measure of transmission quality and service availability of a network or nodes within a network. A QoS rule defines a service priority for routing packets at a node based on a parameter associated with the packet. QoS rules may be applied based on the port, device, protocol, application, tenant, or any other parameter associated with the packet. A QoS rule may specify a packet parameter and a routing priority for the packet parameter. For example, a QoS rule may specify that TCP/IP packets are to be prioritized over other packet types, that packets associated with one tenant are to be prioritized over packets from another tenant, or that a certain amount of bandwidth at the node is to be used for transmitting packets associated with a particular tenant. FIG. 5 is a block diagram showing three QoS flows corresponding to the three types of traffic shown in FIG. 4. In this example, a first rule set QoS#1 controls traffic within a single node or VM. The first rule set QoS#1 controls flows within one VM, for outbound traffic control on interface 152 of container 204-1 in the same node 114-1 within a single host 112-1. A QoS rule set may include one or more rules.

A second rule set QoS#2 controls traffic between two nodes in the same physical host 112-1. The traffic may be between two virtual machines. Traffic control is provided on the interface 152 at a first container 204-1 to control outbound traffic and provide priority control on containers 204-1 and 204-2 at node 114-1. Traffic control may also be provided on the interface 152 at pod 204-4 at node 114-2 to control inbound traffic at switch 154. In one embodiment, switches 154 may be dockers for containers.

A third rule set QoS#3 controls traffic between two nodes in different physical hosts 112-1 and 112-2. The traffic may be between two virtual machines at the two hosts. Traffic control is provided on the interface 152 at pod 204-1 at node 114-1 to control outbound traffic and provide priority control on pods 204-1 and 204-2 at node 114-1. Traffic control may also be provided on the interface 156 at pod 204-8 at node 114-4 to control inbound traffic at switch 154.

Figure 6:
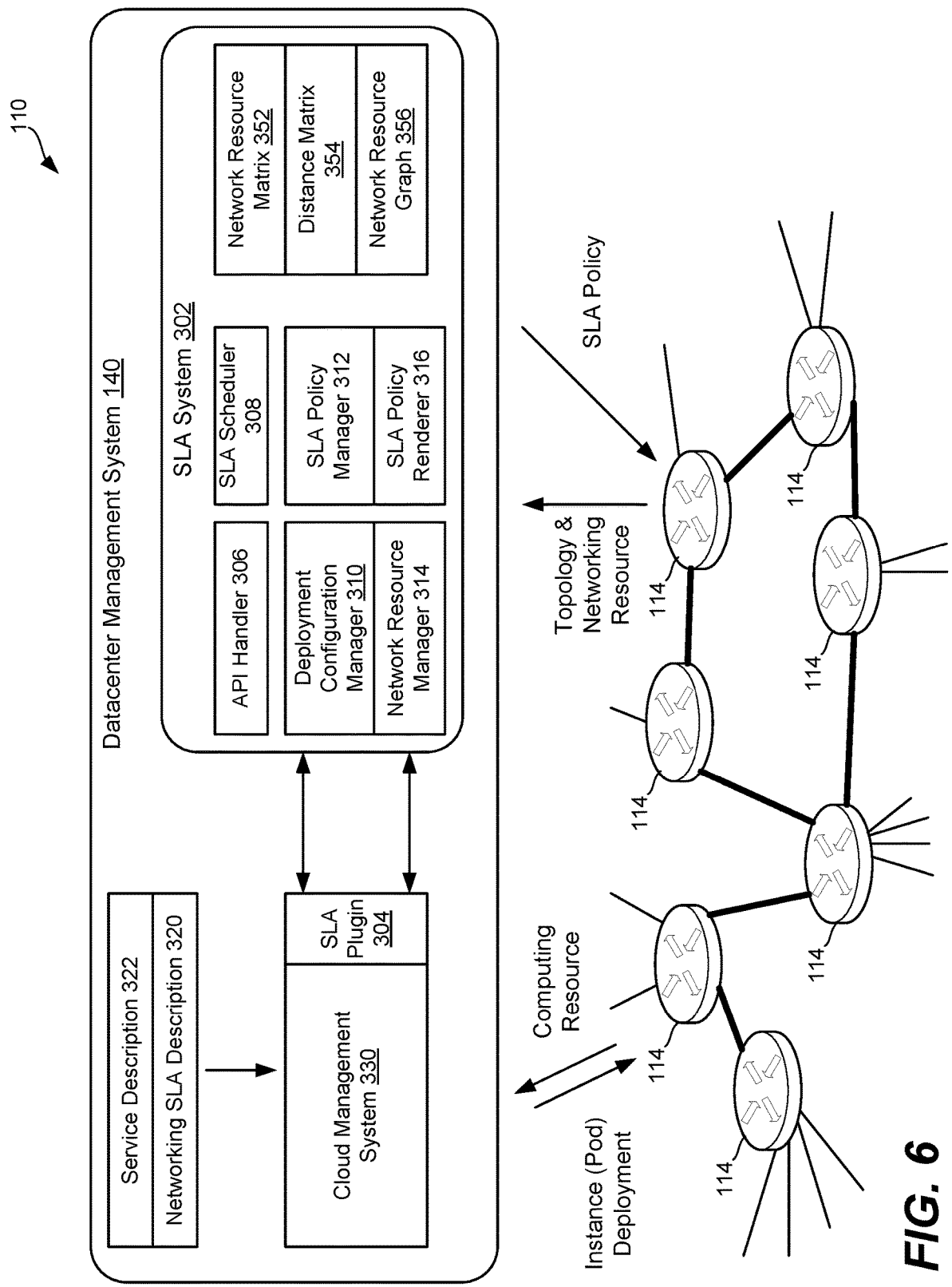
FIG. 6 is a flowchart describing pod deployment scheduling in a computing datacenter according to a networking SLA in accordance with one embodiment.

FIG. 6 is a block diagram depicting a datacenter 110 and datacenter management system 140 in accordance with one embodiment. A plurality of computing nodes 114 at one or more physical machines are depicted in communication with the datacenter management system 140.

Datacenter management system 140 includes a cloud management system 330 which is configured to deploy computing resources at nodes 114 in the datacenter in response to tenant requests. As shown in FIG. 6, CMS 330 is configured to receive a service description 322 specifying customer requirements for deploying computer resources, as well as a networking SLA description 320 corresponding to the service description 322. The service description may specify container groups and corresponding containers or instances to be deployed for particular computing services. The service description may also or alternatively specify pod groups and corresponding pods or instances to be deployed for particular computing services. The service description may specify the type of pods and number of pods to be deployed for each pod group. Additionally, the service description may specify connections between different pod groups.

As with traditional deployment of cloud resources, CMS 330 may utilize a computing SLA to determine what nodes are to be used for deploying the requested resources. For example, CMS 330 may use CPU, memory, and cache specifications to determine at what nodes to schedule or provision pod deployments. In accordance with one embodiment, CMS 330 is configured to receive a networking SLA and schedule cloud resources based on one or more networking SLA requirements. For example, CMS 330 may deploy pods at nodes 114 in the datacenter based on a bandwidth requirement in the SLA and the available bandwidth of links between nodes where the pods are to be deployed. CMS 330 may receive indications of available resources as shown, and in turn schedule instances or pods for deployment in the datacenter.

In one embodiment, the framework for the datacenter depicted in FIG. 6 permits cloud resources to be scheduled based on networking SLA with only minor modifications to existing cloud infrastructures. A modular networking SLA framework is provided that includes interacting APIs to permit an integration of the CMS 330 with the SLA system 302. Information is exchanged and synchronized between the CMS 330 and SLA system 302. Different types of CMS's can call standard APIs to interact with the SLA system 302, providing abstracted APIs in one example that can deliver a wide range of SLA functionalities. In this manner, the CMS 330 remains a final decision point for instance deployment and can maintain information for SLA enforcement.

In one embodiment, offer-based scheduling is provided such that each node 114 (or each physical host) reports to the CMS 330 its available network resources in the form of an offer. CMS 330 may sort these offers according to provisioning purposes, e.g., to minimize the overall maximum workload. In addition, the CMS consults the SLA system 302 to integrate the process of determining what offers to accept with networking SLA requirements.

API handler 306 receives a request from the SLA plugin 304 at CMS 330. In one embodiment, the requests are communicated using a REST API. The API handler 306 extracts the type and payload of each request. The handler then calls the related modules in the SLA system 302 to execute the request. Finally, the API handler 306 replies with the result returned from the appropriate module(s).

Deployment configuration manager 310 is configured to receive instance configurations from the CMS 330. This permits the SLA system to obtain information such as location, affiliation, and networking configurations.

SLA scheduler 308 is configured to implement evaluation offers. The SLA scheduler 308 may implement offer sorting, filtering, and/or adjustment as described hereinafter. The SLA scheduler may provide an evaluation result and/or a relocation result based on current network capacity. In one example, the networking SLA specifies a bandwidth requirement between at least two of the pods.

SLA Policy Manager 312 is configured to handle policy enforcement requests. It generates data-plane SLA policy entries and delegates the policy renderer 316 to push the policies to the dataplane as shown. Manager 312 further maintains both the logical and dataplane policy entries in a database to simplify further policy modifications.

SLA policy renderer 316 is configured to implement the dataplane policies at the openflow-enabled switches within the cloud infrastructure. The implementation of SLA policies utilizes multiple southbound protocols. The SLA policy renderer hides the underlying complexity and provides a clean interface for policy enforcement.

Network resource manager 314 is configured to collect topology and networking resources (e.g., link capacities) from the underlying cloud infrastructure as shown. The network resource manager 314 constructs network resource graph 356. The network resource graph is used by other modules to get the bandwidth capacity between instances and/or to determine a policy enforcement point. The graph can be consulted to generate the path and the available capacity between any pair of deployed pods (or instances). The network resource graph 356 may be any data structure (e.g., a table, list, or database) used to indicate topology and link capacities. Graph 356 may be a data structure or a sub-data structure (e.g. a data structure within a data structure), such as a table, list, or database which may be maintained and operated at a data plane. The graph 356 may be stored in any non-transitory memory storage. The data structures above may be stored and maintained in a storage or memory unit of a host 112.

The network resource matrix (NRM) 352 stores available network resources between deployment entities (DEs) or pods. The term deployment entity may be used to refer to the lowest level computer resource that can be used to instantiate a pod or instance in a given cloud infrastructure. For example, a deployment entity may be a virtual machine, physical host, deployed pod or container, or other entity. In one embodiment, the NRM is an N×N matrix, where N is the number of DEs in the datacenter. For each DE pair, the corresponding value in the NRM is the available network resource (e.g., bandwidth capacity) along their interconnecting path. In one embodiment, the interconnecting paths are only generated in response to changes in topology. The bandwidth capacity is incrementally updated after each bandwidth allocation, enabling fast calculation of the evaluation results. The network resource matrix 352 may be any data structure (e.g., a table, list, or database) used to associate available network resources with deployment entities. Matrix 352 may be a data structure or a sub-data structure (e.g. a data structure within a data structure), such as a table, list, or database which may be maintained and operated at a data plane. The matrix 352 may be stored in any non-transitory memory storage. The data structures above may be stored and maintained in a storage or memory unit of a host 112.

The distance matrix 354 is configured to store the distances between any DEs. In one embodiment, the distance matrix also has a size of N×N. In one embodiment, the distance is calculated as the number of hops between a pair of DEs. The longer the distance, the more links the path occupies. When evaluating offers, the SLA system can sort the offers based on locality by consulting the distance matrix 354 for each inter-connected pair of DEs. The distance information can be used for enforcing networking SLA for latency in the cloud infrastructure. The distance matrix 354 may be any data structure (e.g., a table, list, or database) used to indicate distances between DEs. Matrix 354 may be a data structure or a sub-data structure (e.g. a data structure within a data structure), such as a table, list, or database which may be maintained and operated at a data plane. Matrix 354 may be stored in any non-transitory memory storage. The data structures above may be stored and maintained in a storage or memory unit of a host 112.

Typically, higher-layer links in a cloud hierarchy carry a large amount of traffic and are more prone to congestion than lower-layer links. In one embodiment, the SLA system applies localization to relieve the pressure of high-layer links, as well as to reduce the communication latency. The SLA system may use distance and overall link utilization as metrics in a heuristic for scheduling deployment of cloud resources. In one embodiment, the SLA system attempts to introduce a least load increase to links, and to place communicating instances as close as possible in order to fulfill a service request to deploy resources.

CMS 330 is one example of a means for receiving a networking service level agreement (SLA) associated with deploying a plurality of pods in a computing datacenter. In one example, the networking SLA specifies a bandwidth requirement between at least two of the pods. In one example, the means are for receiving a bandwidth requirement in association with a deployment of a plurality of instances of computing services at a computing datacenter. In one example, the means are for receiving a request to deploy a plurality of pods in a computing datacenter based on a service level agreement (SLA) specifying a bandwidth requirement between two or more of the pods.

CMS 330 is one example of a means for receiving from a set of nodes in the datacenter a set of offers indicating initial network resources such as initial bandwidth associated with the corresponding node.

CMS 330 is one example of a means for deploying the plurality of pods at a subset of nodes of the computing datacenter based on available network resources associated with the set of offers. In one example, the means are for deploying a plurality of instances at a subset of the set of nodes based on the distances between interconnected instances and the remaining capacity of links between the interconnected instances. In one example, the means are for scheduling the plurality of pods at a subset of nodes from the set based on the remaining bandwidth of each node.

CMS 330 includes an SLA plugin 304 permitting communication and synchronization between the CMS 330 and SLA system 302. The SLA plugin in one embodiment extracts the offers received from nodes 114 and consults the SLA system for placement solutions considering network resources. In one embodiment, SLA plugin 304 at CMS 330 is configured to communicate with the SLA management system 302 using a restful API (e.g. REST). The SLA plugin integrates the SLA functionalities of the SLA system 302 with the CMS 330. In one embodiment, it parses specifications from tenants and extracts one or more SLA requirements (also referred to as intentions). The SLA plugin intercepts offers of the CMS and consults the SLA system 302 for evaluation. The SLA system replies with placement recommendations for placement, such as by providing an ordered list of nodes representing which nodes have more capacity to meet the SLA requirements.

SLA system 302 (e.g., SLA scheduler 308) is one example of a means for receiving a networking service level agreement (SLA) associated with deploying a plurality of pods in a computing datacenter. In one example, the means are for receiving a bandwidth requirement in association with a deployment of a plurality of instances of computing services at the computing datacenter. In one example, the means are for receiving a request to deploy a plurality of pods in a computing datacenter based on a service level agreement (SLA) specifying a bandwidth requirement between two or more of the pods.

SLA system 302 is one example of a means for receiving from a set of nodes in the datacenter a set of offers indicating initial network resources associated with the corresponding node. In one example, the means are for receiving from a plurality of nodes in the computing datacenter a plurality of indications of initial bandwidth available at the plurality of nodes. In one example, the means are for receiving from a set of nodes in the computing datacenter an indication of initial bandwidth associated with each of the nodes.

SLA system 302 is one example of a means for determining for the set of offers available network resources associated with meeting the SLA using the set of nodes. In one example, the means are for determining for the plurality of nodes a distance between interconnected instances of the plurality and means for determining for at least a portion of the plurality of nodes a remaining capacity of links between interconnected instances based on the indications of initial bandwidth and the bandwidth requirement. In one example, the means are for determining for the set of nodes a remaining bandwidth associated with each node based on the indication of initial bandwidth and the bandwidth requirement.

Figure 7:
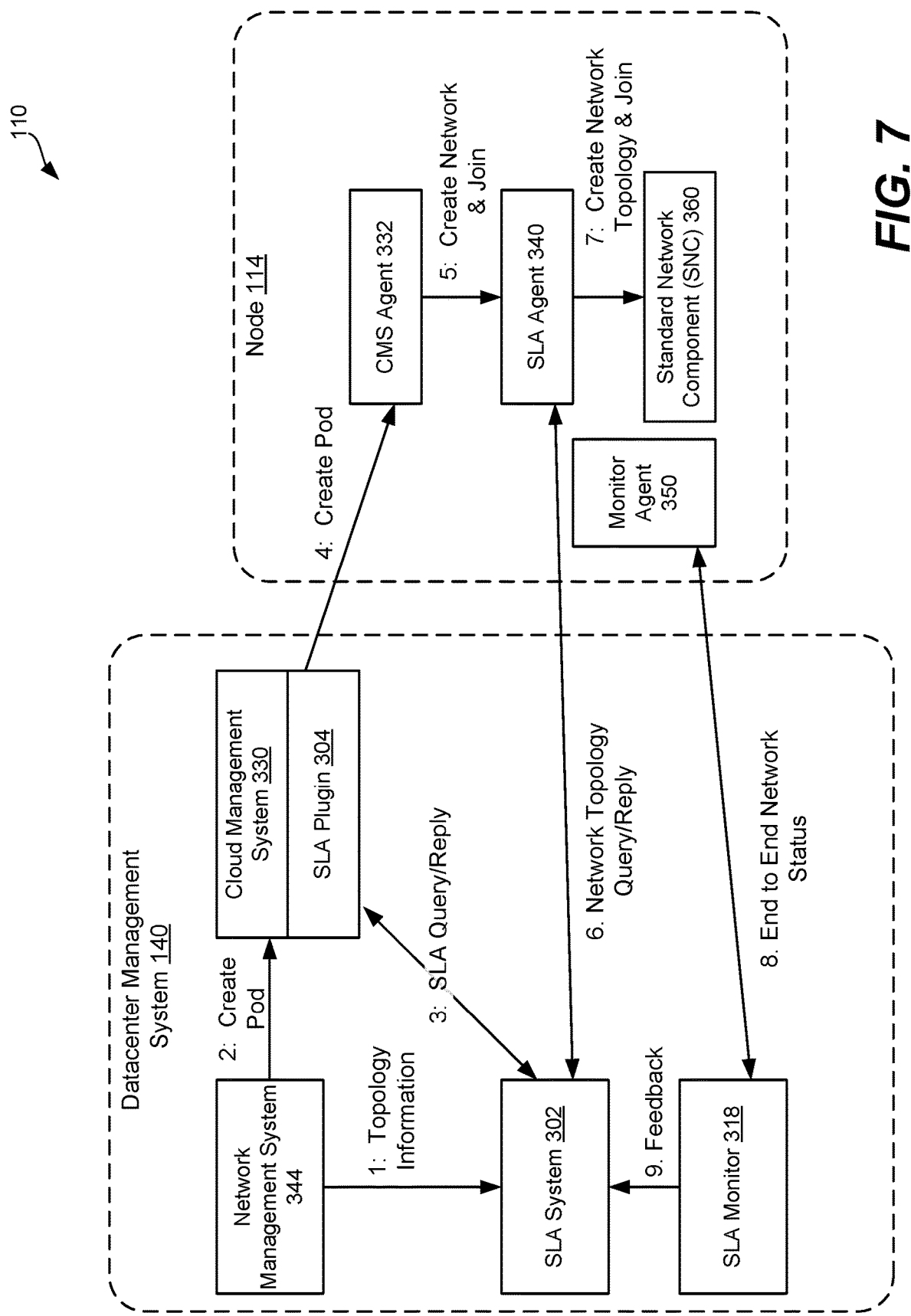
FIG. 7 is a block diagram depicting quality of service (QoS) flows for a networking SLA in accordance with one embodiment.

FIG. 7 is a block diagram of a datacenter, depicting a flow between modules of the datacenter to deploy cloud resources based on a tenant request. A network management system (NMS) 344 serves as an overall interface between the datacenter and users, routing requests to the appropriate modules. Network management system 344 receives a request to deploy cloud resources, such as one or more pod groups in datacenter 110. As shown in FIG. 6, the tenant request may include a service description relating to the cloud services to be scheduled, as well as a networking SLA description that specifies SLA requirements between components of the cloud to be deployed. A computing SLA description may be received as well, specifying requirements of the computer resources for instantiating the cloud services.

In response to the tenant request, NMS 344 issues a request to CMS 142 to create a pod and provides topology information for the cloud infrastructure to SLA system 302. CMS 330 receives the request and contacts SLA plugin to initiate SLA functionalities. SLA plugin 304 parses the SLA specification and extracts the various requirements. SLA plugin 304 then issues a query or request to SLA system 302 to evaluate offers for the SLA specification. In one embodiment, offers are received at the CMS 330 from an SLA agent 340 at each of the nodes. The SLA plugin 304 provides the offers from CMS 330 to the SLA system with the request to evaluate the offers based on the SLA specification. In another embodiment, the SLA agents 340 at the nodes provide offers directly to the SLA system 302.

The SLA system receives the offers and evaluates them according to the SLA specification. As described hereinafter, various filtering, sorting, and evaluations may be performed to evaluate nodes for fulfilling the service description and SLA specification. In one embodiment, the SLA system generates an ordered list of offers or nodes that can fulfill the service description and SLA specifications. The offers can be ordered based on their capacity to fulfill the tenant request. Other factors such as locality can be used to sort the list. The SLA system 302 replies to the CMS system 330 with the ordered list of offers or nodes. After receiving the evaluated offers, the CMS schedules the necessary cloud resources for deployment in the datacenter. The CMS can schedule instances, containers, and/or pods for execution at nodes 114 in the datacenter. The CMS determines what nodes to use based on the ordered list. The CMS may also use a computing SLA and other requirements to determine which nodes to use. These will be used in combination with the ordered list based on the networking SLA requirements.

After determining the deployment of resources for the tenant request, the CMS issues a request to a CMS agent 332 at each selected node 114. The request is for a pod to be deployed at the node. In response to the create pod request, the CMS agent issues a request to SLA agent 340. The CMS agent requests that the SLA agent create a network and have the pod join it.

The SLA agent then requests network topology information from the SLA system 302. The SLA system replies with network topology information. The SLA agent then creates the necessary network topology for the pod and instantiates the pod at the node to join the network. The creation of a standard network component (SNC) 360 is shown in FIG. 7.

In FIG. 7, the datacenter management system includes an SLA monitor 318 that communicates with a monitor agent 350 at each node in the datacenter. The monitor agents report to the SLA monitor which generates an end to end network status. The SLA monitor may enforce dataplane policies at each node.

Figure 8:
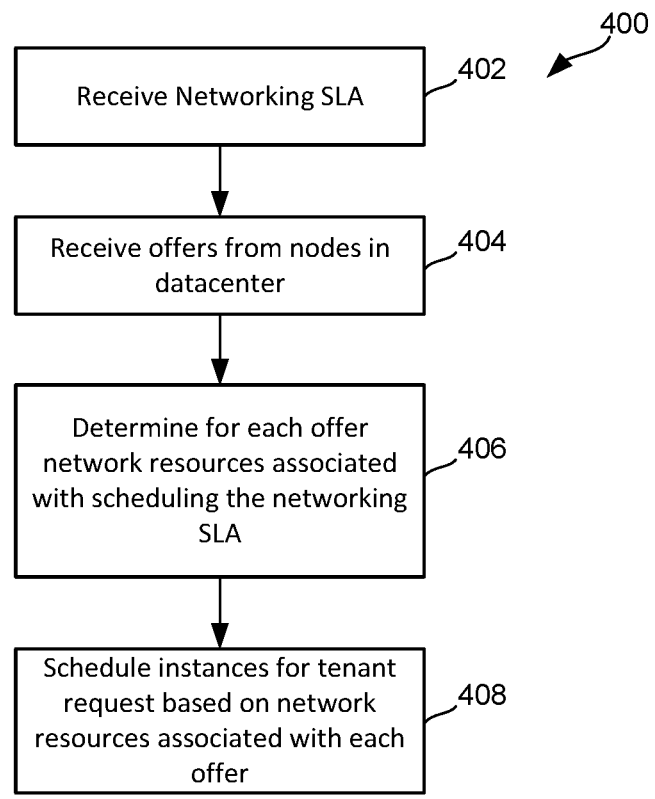
FIG. 8 is a flowchart describing evaluating nodes based on network resources associated with meeting a networking SLA requirement in accordance with one embodiment.

FIG. 8 is a flowchart describing a process 400 for scheduling cloud resources in a multi-tenancy datacenter in accordance with one embodiment. Process 400 may be practiced in the environment of FIG. 1 using an SLA management system 302, but is not limited to such an example of a network environment. Process 400 may be performed by various elements in FIGS. 6 and 7, but is not limited to those examples.

At step 402, the SLA management system 302 receives a networking SLA associated with a tenant request to schedule cloud resources in the datacenter. As will be described hereinafter, process 400 may be performed for an initial deployment of cloud resources in a proactive mode to fulfill a tenant request. In a passive mode, process 400 may be performed to redeploy cloud resources after an initial deployment in response to the tenant request. For example, the SLA system may schedule resources for fulfill a service description without consideration of a networking SLA. The networking SLA may be used after the initial deployment to redeploy resources based on the SLA requirements.

At step 404, the SLA system receives offers from nodes in the datacenter indicating initial network resources available at each node. The offers may be received directly from the nodes 114 at the SLA system, or may be received from the CMS after the CMS receives the offers from the nodes. Each offer indicates current network resources that are available at the node. For example, the offer may indicate the bandwidth available at the node, or a current drop rate or latency associated with the node. It is noted that the offers at step 404 may be received prior to or after receiving a tenant request and/or the networking SLA. For example, the offers may be received in response to a tenant request in one embodiment. In another embodiment, each node may issue an offer periodically. The SLA system may use a previously received offer to evaluate a later-received SLA specification.

At step 406, the SLA system determines for each offer network resources associated with scheduling the networking SLA for the service description. The SLA system may determine a distance (e.g., number of hops) between interconnected pods in one embodiment. The SLA system may evaluate paths between all interconnected pods for an offer. The SLA system may determine a remaining capacity of all the links belonging to a path between interconnected pods in one embodiment. In one embodiment, the SLA system generates a list of offers at step 406. The list may be ordered to indicate an overall network cost associated with implementing the networking SLA for each offer. Lower cost offers or nodes may be placed higher on the list for consideration prior to other offers.

At step 408, the CMS schedules cloud resources for deployment at nodes in the network based on the network resources associated with each offer. In one embodiment, the CMS receives the ordered list from the SLA system 302. The CMS uses the list, indicating the cost associated with each offer for implementing the SLA, in determining where to deploy the cloud services. For example, the CMS may utilize the list in combination with a computing SLA to determine the nodes for instantiating the requested services.

In one embodiment, the SLA scheduling is done based on the node with the most available resources for the networking SLA. In one embodiment, SLA scheduling is done based on the node with the fewest resources capable of meeting the networking SLA. Complex calculations and/or batch processing can be used. In one example, a pod is deployed on the node with the most available resources and can later be moved to another node with fewer resources if the node with more resources is needed for a pod requiring more resources.

In one embodiment, step 408 includes deploying one or more quality of service (QoS) rules at the nodes with the pod deployments. The QoS rules may include rules deployed for enforcement across one or more pods, rules deployed for enforcement across one or more virtual machines, and/or rules deployed for enforcement across one or more physical machines.

Figure 9:
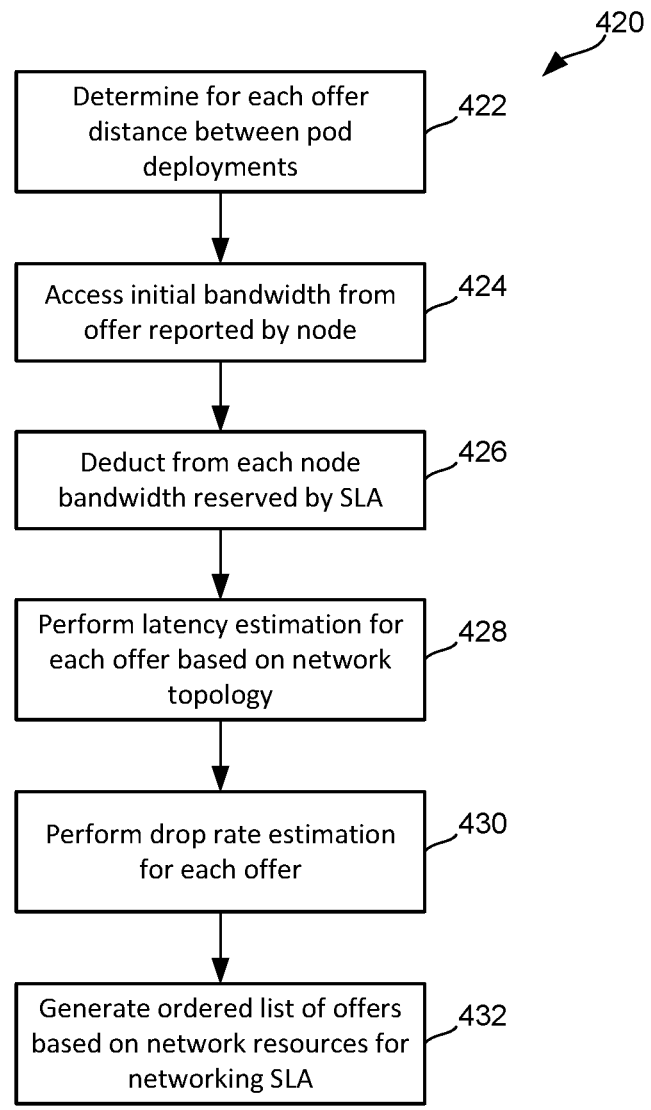
FIG. 9 is a graph describing a process of determining initial bandwidth at a computing node in accordance with one embodiment.

FIG. 9 is a flowchart describing a process 420 of determining network resources associated with scheduling a networking SLA for an offer received from a node. In one example, process 420 may be used at step 406 of process 400 to determine network resources associated with offers. Process 420 describes using bandwidth information to generate an ordered list of offers based on network resource requirements. Process 420 may be performed by an SLA management system 302 in one embodiment.

At step 422, the SLA system determines for a plurality of offers a distance between pod deployments associated with the SLA specification from the tenant request. The distance may be determined as a number of hops between deployment entities where the pods are deployed for the offer.

At step 424, the SLA system accesses the initial bandwidth reported in the offers from each node. Various techniques may be used at the nodes to determine an initial bandwidth. In one embodiment, the initial bandwidth is an amount of bandwidth currently available at the node. Estimations based on CPU usage and other techniques may be used.

At step 426, the SLA system deducts from the initial bandwidth of each offer, the bandwidth requirement from the SLA. For each offer, the SLA system can deduct the bandwidth reserved by the SLA for a pod deployed at the node.

At step 428, a latency estimation is performed for each node based on the network topology. In one embodiment, the latency estimation is performed by the SLA agent at each node. In another embodiment, the SLA management system 302 performs the latency estimation at step 428. Step 428 is optional. In one embodiment, the system performs the network resource analysis for the offers based on bandwidth alone.

At step 430, a drop rate estimation is performed for each node. The drop rate estimation can be performed by the SLA agent at each node or by the SLA management system 302. The drop rate estimation is optional, for example, where bandwidth alone is used to schedule the cloud resources.

At step 432, the SLA system 302 generates an ordered list of the offers based on the network resource analysis. In one example, the SLA system generates a score for each offer or a subset of the offers based on the network resource analysis. The score may be based on the distance between pod deployments associated with the offer and a cost representing network capacity required to fulfill the networking SLA using the offer. Offers that use fewer resources or that have closer pod deployments may be scored higher and therefore, placed above lower scoring offers. The ordered list is provided form the SLA system to the CMS for use in scheduling the cloud resources at the datacenter.

Figure 10:
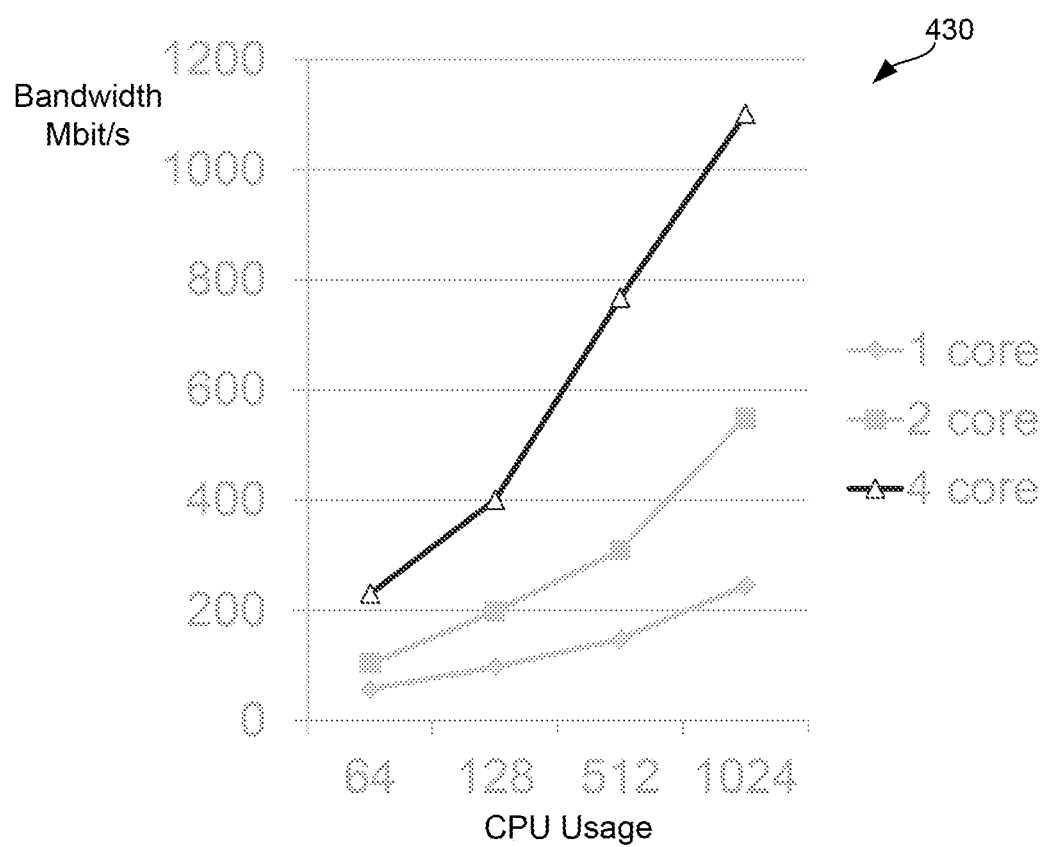
FIG. 10 is a block diagram depicting different types of traffic for a networking SLA in accordance with one embodiment.

FIG. 10 depicts a graph 430 illustrating bandwidth usage at a node as a function of CPU usage. FIG. 10 illustrates that as CPU usage increases, bandwidth usage generally increases. Accordingly, the bandwidth usage at a particular computing node can be estimated based on the amount of CPU usage at the computing node. In one example, the initial bandwidth associated with a node can be determined based on the amount of CPU usage at the node. The amount of CPU usage can be determined and correlated to an amount of bandwidth. The remaining bandwidth at the node can then be determined and reported in an offer from the node to the SLA system as the initial bandwidth. In one embodiment, the initial bandwidth accessed at step 424 is determined from CPU usage at a compute node.

FIG. 11A and FIG. 11B is a block diagram of a portion of a datacenter, illustrating a an example of bandwidth between nodes in a datacenter. Two nodes 114 in communication with a switch 158 in FIG. 11A. Three pods 204 are deployed at each node. Within each node, the pods communicate with a switch 154 which is coupled to an interface 156. The interface at each node is coupled to switch 158. FIG. 11B is another representation of the datacenter, depicting the pods 204 coupled to switch 154, which is in turn coupled to switch 158. Switch 158 is coupled to a higher layer switch 159. FIG. 11B depicts the bandwidth capacity of the links between the nodes. The links between pods 204 and switch 154 have a capacity of 10 Gbps. The links between switches 154 and switches 158 have a capacity of 40 Gbps, as do the links between switches 158 and switch 159.

As FIG. 11B illustrates, typical infrastructures have lower bandwidth capacities at lower levels in the networks. Accordingly, one embodiment includes analyzing the near-node network resources for pod deployments, while ignoring far-node resources. In this manner, an analysis of the network resources for an offer to fulfill a networking SLA can be simplified to speed up the deployment process. In one embodiment, the near-node resources are evaluated at step 426 of process 420 in order to deduct the bandwidth reserved by the SLA from the initial bandwidth reported by each node.

FIGS. 12A-12C are block diagrams of a portion of datacenter 110, describing a process of determining an amount of bandwidth at a node or offer in association with an SLA specification. The process described in FIGS. 12A-12C may be used at step 426 to determine an amount of bandwidth in association with the SLA specification to deduct from the initial bandwidth reported by a node in an offer. The process may be used as part of calculating a remaining capacity at each node for each offer. In one example, the process can be performed by the SLA system 302.

An example of a customer or service specification for cloud resource deployment is depicted in FIG. 12A. FIG. 12A continues with the example shown in FIG. 3. The service specification specifies that two pod groups be generated, with a first pod group having four pods and the second pod having two pods. Each pod within the pod group instantiates the same computing service, such as a web server. In one example, pod group 202-1 includes four web pods 204-1 that provide a web service and pod group 202-2 includes two database pods 204-2 that provide a database service.

In the example of FIG. 12A, the tenant request includes a networking SLA specifying a minimum bandwidth of 5 Mbps for the paths between each pod of the first pod group and each pod of the second pod group. As shown, a total of eight paths are to be provided to interconnect the four pods of one group with the two pods of the other group.

The SLA management system 302 converts the link requirements from the networking SLA into a node requirement that can be used to deduct a bandwidth required at each node for an offer. FIG. 12B depicts a first step where the SLA system 302 aggregates the links for each pod to convert the link requirements into a pod requirement for each pod. In this example, the pods of group 202-1 each include a 10 Mbps aggregated bandwidth requirement. The aggregated bandwidth requirement is determined by taking the sum of each link requirement including the pod. The pods of group 202-2 each include a 20 Mbps aggregated bandwidth requirement.

FIG. 12C depicts a second step where the SLA system 302 aggregates the link from each pod to convert the pod requirements into a node requirement. In this example, two pods of pod group 202-1 are positioned or scheduled at a first node 114-1 and two pods are scheduled at a second node 114-2. Both pods of pod group 202-2 are placed at a third node 114-3. SLA system 302 aggregates the pod bandwidth requirement at nodes 114-1 and 114-2 into node requirements of 20 Mbps each. SLA system 302 aggregates the pod bandwidth requirement at node 114-3 into a node requirement of 40 Mbps.

The SLA system can use the node bandwidth requirements to determine a bandwidth associated each with node for each offer. For example, the SLA system can deduct from the initial bandwidth reported by a node in an offer the aggregated bandwidth requirement for the node to determine a remaining capacity for each node in association with each offer.

Figure 13:
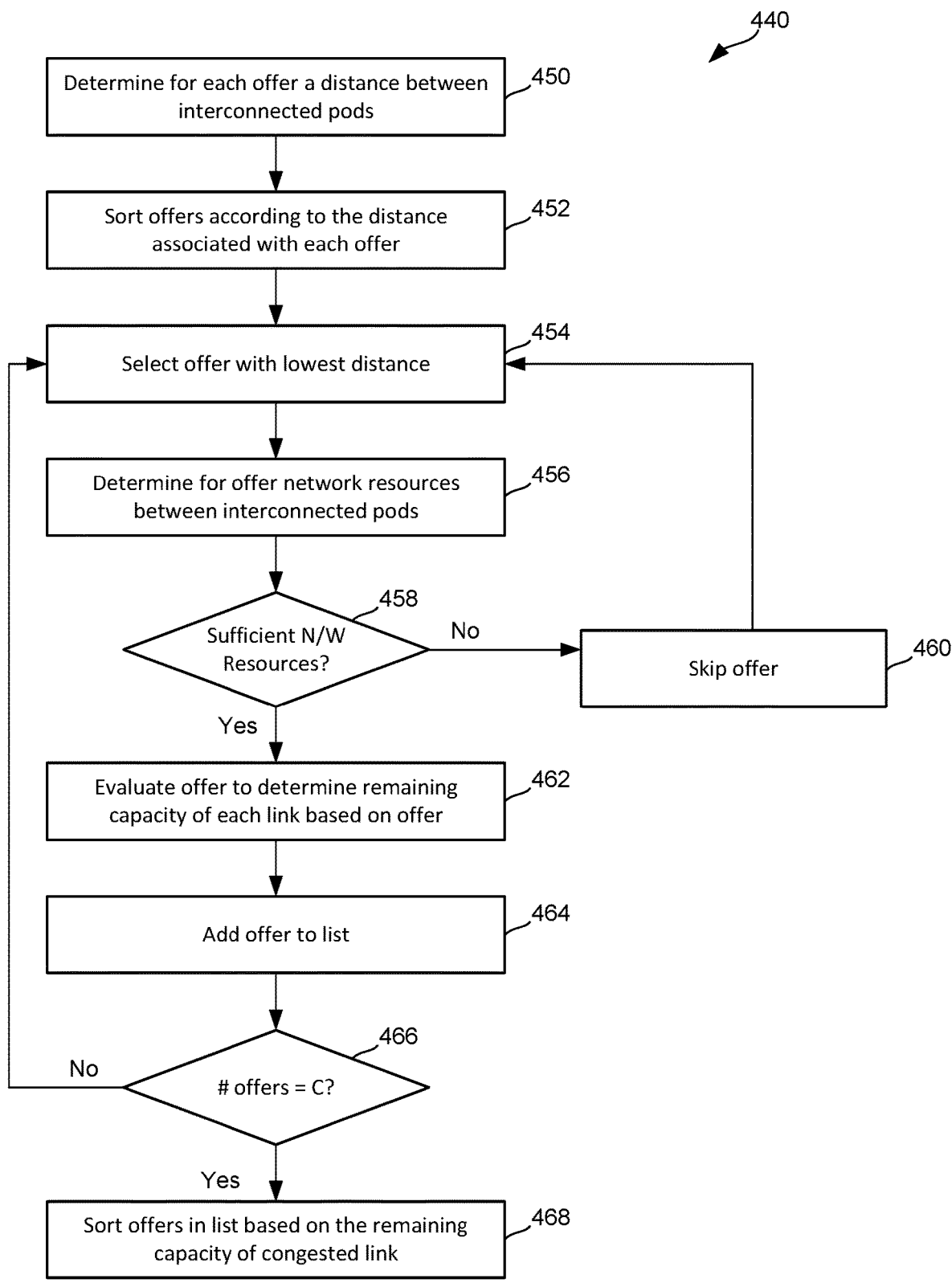
FIG. 13 is a flowchart describing a process of generating an ordered list of node offers for scheduling pods in a computing datacenter.

FIG. 13 is a flowchart describing a process 440 of generating an ordered list of offers in response to a networking SLA as may be received in a tenant request to deploy cloud services at a datacenter. In one embodiment, process 440 can be performed as part of process 420, for example, to generate the ordered list of offers at step 432. In one example, process 440 is performed by SLA system 302.

The SLA system accesses a plurality of offers received from a plurality of nodes. The offers may be received periodically or may be received in response to specific tenant requests. At step 450, the SLA system determines for each offer, a distance between interconnected pods or instances associated with the networking SLA. In one example, the SLA system calculates for each offer the total distance between interconnected pairs of instances involved in the networking SLA. In one embodiment, the calculation at step 450 uses the Distance Matrix 354. The complexity of the calculation in one example is $O(N \times P)$, where P is the number of peering instances.

At step 452, the SLA system sorts the offers according to the distance calculated for each offer. The SLA system sorts the offers into a list in one example so that the lowest distance offer appears first in the list. This enables offers with a better locality (smaller distance) to be evaluated before offers having a worse locality (larger distance). Given N offers, the complexity of the sorting operation in one example is $O(N \times \log N)$.

At step 454, the SLA system selects the first offer from the list to select the offer having the lowest distance. At step 456, the SLA system determines the network resources associated with the offer at step 456. In one example, the SLA system determines the network resources between interconnected pods or instances for the offer.

In one example, the SLA system consults an instance configuration manager to determine which instances are related to the SLA policy. The SLA system converts the original evaluating request into corresponding inter-pod demands. The inter-pod demands may be determined as the bandwidth requirement between deployment entities.

At step 458, the SLA system determines whether the offer has enough network resources to fulling the networking SLA. In one embodiment, the SLA system accesses the network resource matrix 352 to determine whether the offer has enough network resources. The SLA system may use the matrix to filter offers without enough network resources. Each deployment entity or pod can be filter with $O(1)$ complexity.

If the offer does not have enough network resources, the SLA system skips or discards the offer at step 460 and proceeds to step 454 to select the next offer having the lowest distance. If no offers remain, the SLA system can determine that the network capacity is insufficient to meet the networking SLA.

If an offer has enough network resources, the offer is evaluated at step 462. In one example, step 462 includes evaluating the path between each of the related instance pairs for the networking SLA for the offer. For each pod or deployment entity, the SLA system determines the remaining capacity of each link after enforcing the instance for the offer. The SLA system can determine the most congested link for the offer. The offer is then added to a list of potential offers at step 464. In one example, an indication of the value of the most congested link for each offer is included in the list.

At step 466, the SLA system determines if the number of offers in the list is equal to a predetermined number C. Step 466 is optional as all offers may be evaluated in one embodiment. If the number of offers is not equal to C, the SLA system returns to step 454 to select the next offer with the lowest distance.

If the number of offers is equal to C, the SLA system sorts the offers based on the value determined for the most congested link of each offer. The offer with the least congested link appears first on the list to indicate its high suitability and efficiency in serving the networking SLA. The SLA system is configured in one embodiment to return at most C offers to provide a faster response time. By sorting the offers according to distance, then sorting a predetermined number of offers based on remaining capacity, an efficient process can be used. The ordered list of offers can be provided form the SLA system to the CMS.

Figure 14:
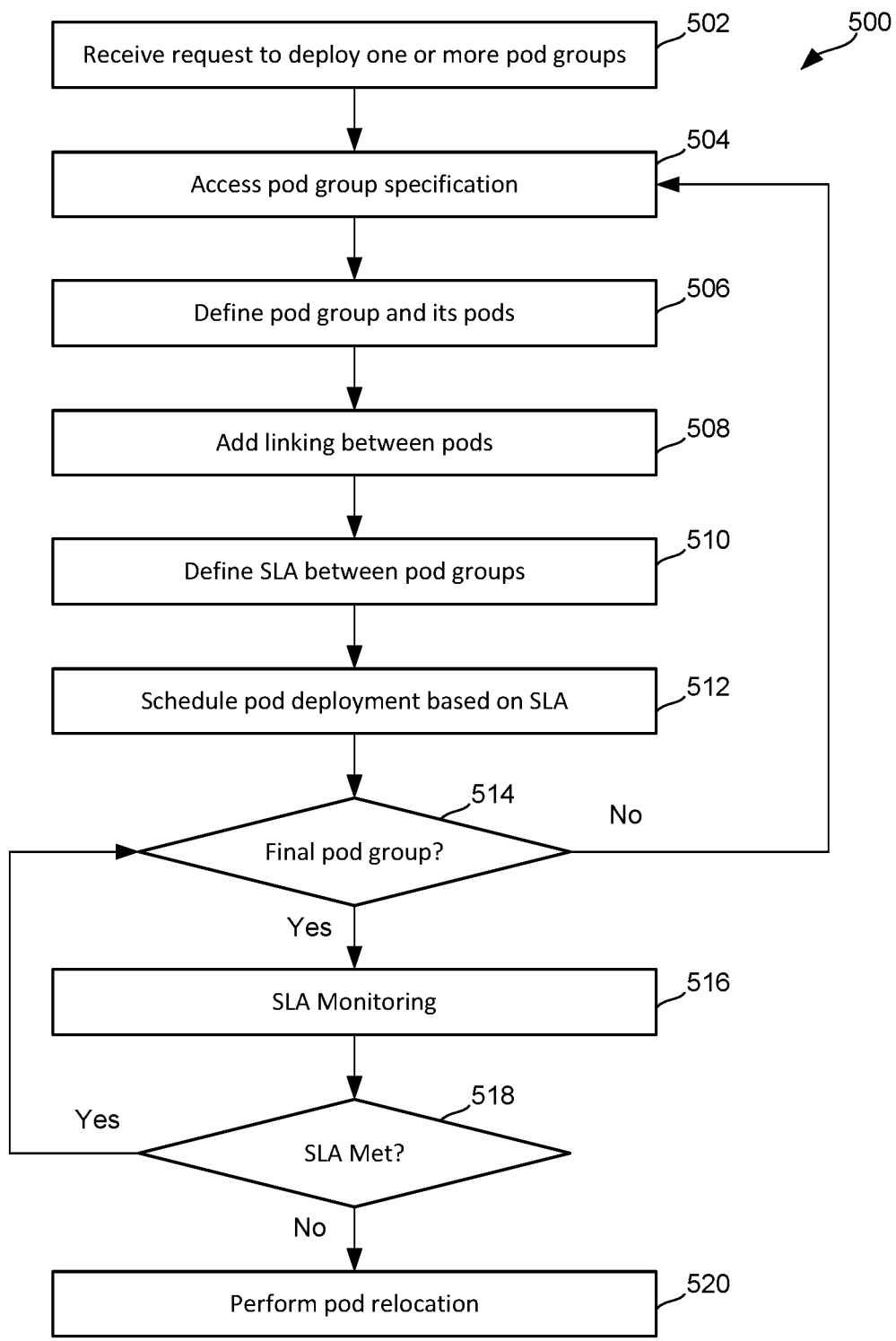
FIG. 14 is a flowchart describing pod deployment and monitoring in accordance with one embodiment.

FIG. 14 is a flowchart describing a process 500 of pod deployment for a first mode in accordance with one embodiment. The process 500 of FIG. 14 may be referred to as a proactive mode as the CMS uses available network resources in an initial pod deployment for a tenant request. The CMS consults the SLA system to determine the network's capability to service the networking SLA. Nodes are selected in the datacenter based on the capacity of the nodes to service the networking SLA.

At step 502, the datacenter management system receives a tenant request to deploy one or more pod groups. The tenant request may include a service specification, a computing SLA, and/or a networking SLA. At step 504, the system accesses the pod group specification for a first pod group. At step 506, the system defines the pod groups and its pods. At step 508, the system adds linking between pod groups if multiple pod groups have been defined. At step 510, the system defines the SLA between the pod groups. In one embodiment, step 502 is performed by a network management system and steps 504-510 are performed by a cloud management system. Other components may perform these functions.

At step 512, the system schedules the deployment of pods based on the networking SLA. Step 512 is performed by process 400 of FIG. 8 in one embodiment. In one embodiment, the CMS issues a request to the SLA system to generate a list of offers for the networking SLA. The CMS receives the list from the SLA system and uses it in determining the nodes for deployment of pods to meet the networking SLA.

At step 514, the system determines if all of the pods groups have been defined. If additional pod groups are to be defined, the process continues at step 504. If all pod groups have been defined, the process proceeds to step 516. Step 516 is performed by SLA monitor 318 and monitor agents 350 in one example. The monitor agents at each node monitor bandwidth, latency, drop rate, etc. to determine whether the networking SLA is being met. If the SLA is not met, the system attempts to relocate pods at step 520 in an effort to comply with the networking SLA specifications. If the networking SLA is not met, a report can be generated and the service possibly terminated.

Figure 15:
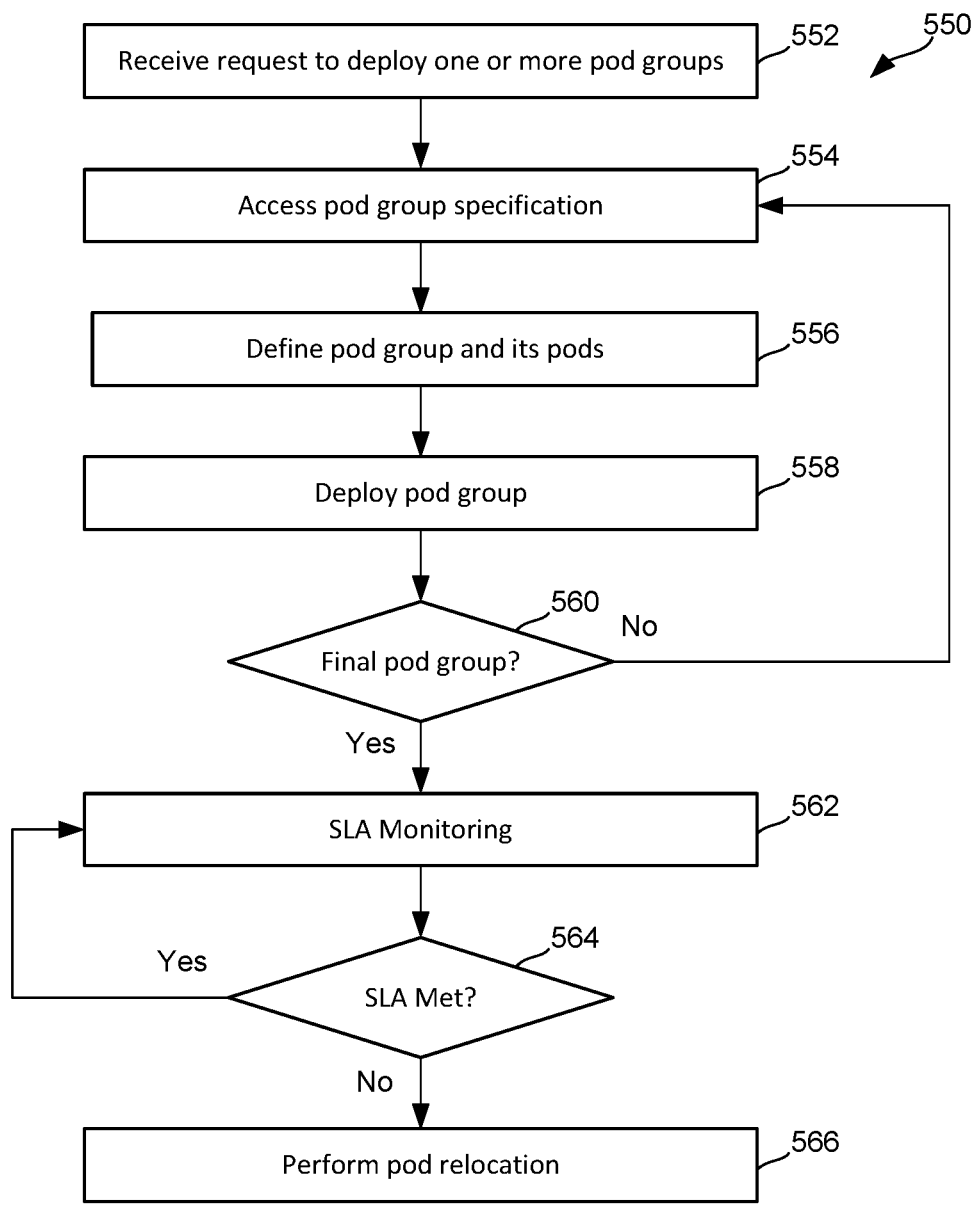
FIG. 15 is a flowchart describing pod deployment and monitoring in accordance with one embodiment.

FIG. 15 is a flowchart describing a process 550 of pod deployment for a second mode in accordance with one embodiment. The process 550 of FIG. 15 may be referred to as a passive mode because the CMS deploys the pod groups for the service specification prior to determining the network resources associated with meeting the networking SLA. After deploying the pods, the system monitors the deployment and modifies it to meet the networking SLA if needed.

At step 552, the datacenter management system receives a tenant request to deploy one or more pod groups. The tenant request may include a service specification, a computing SLA, and/or a networking SLA. At step 504, the system accesses the pod group specification for a first pod group. At step 506, the system defines the pod group and its pods. At step 558, the CMS deploys the pods for the pod group. Step 558 may include evaluating nodes in the datacenter to meet a computing SLA specifying computer resources such as CPU, etc.

At step 560, the SLA system determines if there are additional pod groups to deploy for the tenant request. If additional pod groups remain, the process returns to step 554 to access the specification for the next pod group.

After all pod groups have been deployed, the system monitors the network to determine if the networking SLA is met at step 564. If the SLA is not met, the system attempts to relocate pods at step 566 in an effort to comply with the networking SLA specifications. If the networking SLA is not met, a report can be generated and the service terminated.

In one embodiment, the SLA system provides a hybrid approach where the passive and proactive modes are both used. A threshold number of nodes having a minimum available resource level can be established. When the number of nodes having the available resources is above the threshold, the passive mode is used to increase deployment speed. When the number of nodes is below the threshold, the proactive mode is used to decrease the probability that redeployments will be needed.

Figure 16:
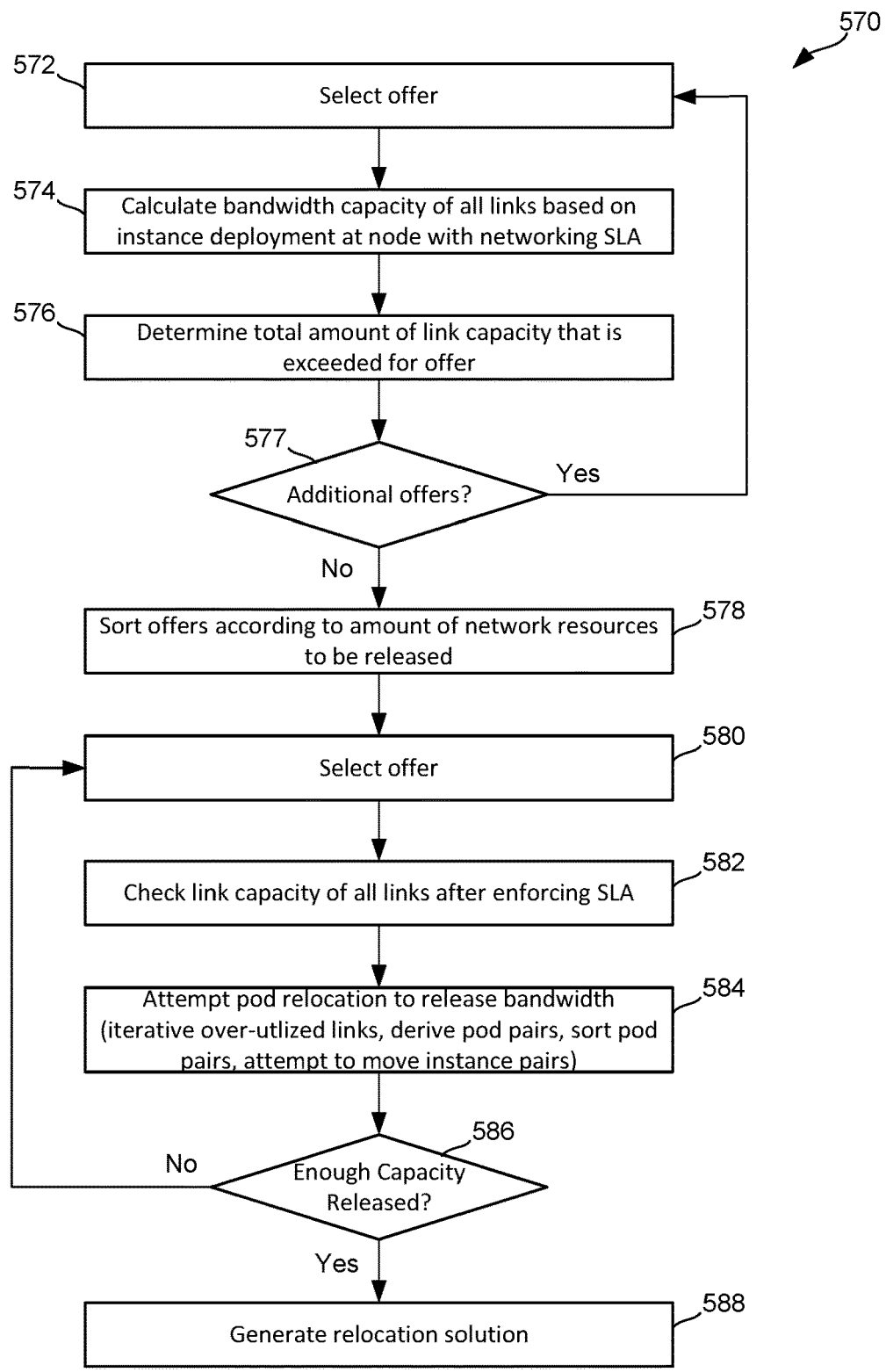
FIG. 16 is a flowchart describing pod relocation in accordance with one embodiment.

FIG. 16 is a flowchart describing a process 570 of relocating pods in accordance with one embodiment. In one example, process 570 can be performed in response to determining that a networking SLA specification for a tenant deployment is not being met. In one embodiment, process 570 is performed by SLA management system 302. In one embodiment, process 570 is used to generate one instance relocation solution for the networking SLA. In another embodiment, the SLA system attempts to generate several instance relocation solutions to accommodate the networking SLA.

At step 572, the system selects an offer. For each offer, the system assumes that the target instance can be accommodated at the node corresponding to the offer. At step 574, the system calculates the bandwidth capacity of all links based on deploying the target instance at the node with the networking SLA. Using the link utilizations related to the offer, the system calculates the total amount of link capacity that is exceeded by the offer. The total amount of exceeded link capacity for the offer indicates the amount of network resources to be released if the offer is used. After calculating the exceeded link capacity, the system determines if there are additional offers to evaluate at step 577. If additional offers are to be evaluated, process 570 continues at step 572 to select the next offer.

Once all offers have been calculated for exceeded link capacity, the offers are sorted at step 578 according to the amount of network resources to be released for each offer. The offer that requires the least amount of resources to be released is placed at the top of the list so that it is considered first in later steps. Thus, the system evaluates offers having lower resource release requirements before evaluating offers having higher resource release requirements.

After sorting the offers, the system selects the offer from the top of the list at step 580. For each offer, the system attempts to generate a relocation solution. The system can iterate the offers in one embodiment as each relocation solution may include replacement of multiple instances.

To check the relocation solution for an offer, the system checks the capacity of all links after enforcing the networking SLA for the offer at step 582. The system derives which links are over-utilized. At step 584, the system attempts to relocate one or more instances to release network resources (e.g., bandwidth) for the offer. In one example, the system iterates over the over-utilized link. The system derives all the instance pairs whose inter-connecting links overlaps with the over-utilized links. For each over-utilized link, the corresponding instance pairs can be sorted in descending order according to how much they contribute to the link congestion (pairs contributing more at the top of the list). The system attempts to relocate the instance pairs so that no new over-utilized links should exist because of the relocation, and so that the current over-utilized links do not become more congested.

At step 586, the system checks whether enough capacity has been released for all of the over-utilized links. If the enough capacity is released, a relocation solution is generated at step 588. If enough capacity is not released, the process continues with the next offer at step 580. If the system fails to generate a solution for all offers, the networking SLA may be determined to not be able to be met. In one example, the number of offers that are iterated and the maximum number of solutions that can be configured can be restrained to provide faster response times.

Figure 17:
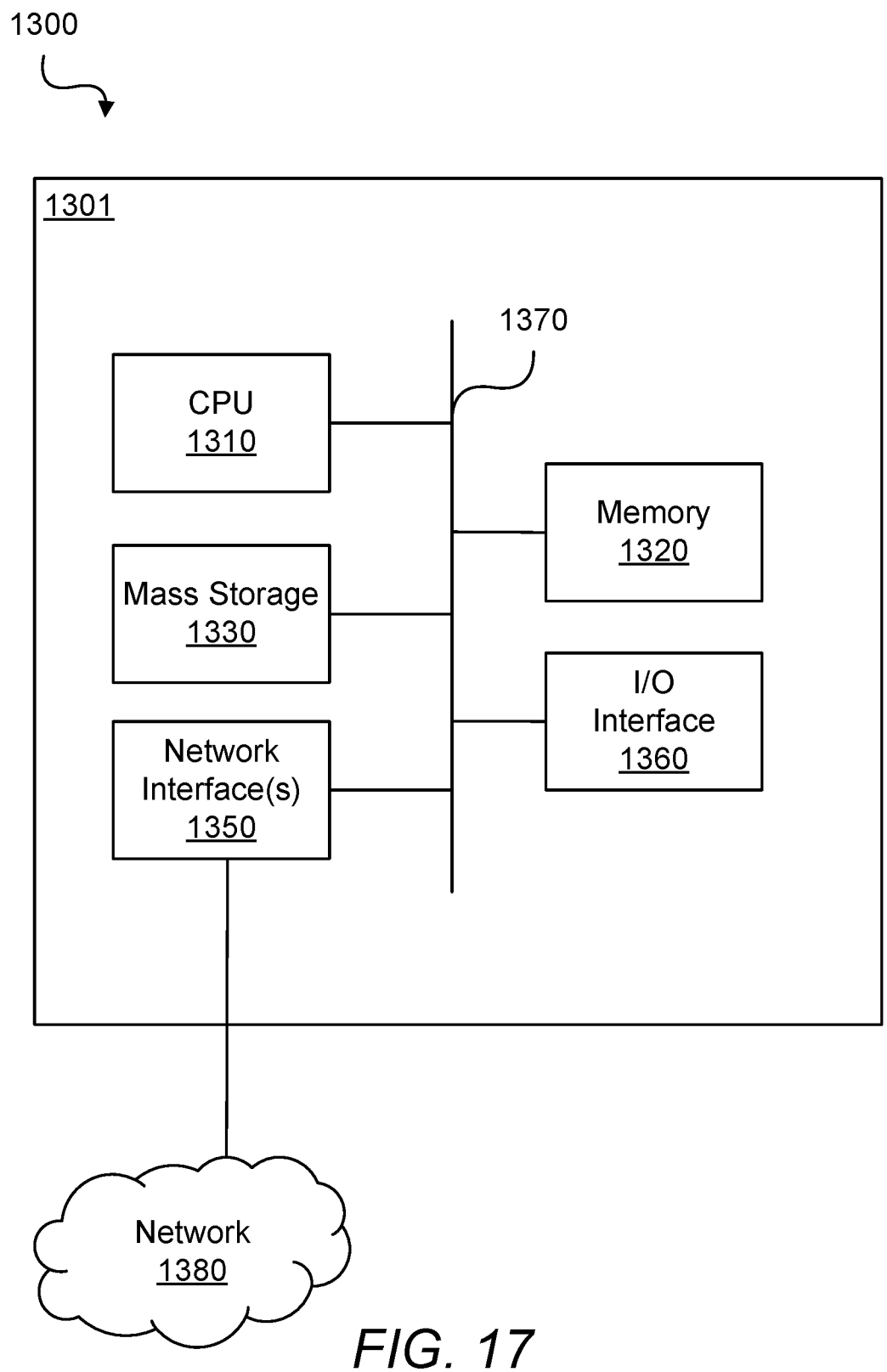
FIG. 17 is a block diagram of a computing system such as a computing datacenter.

FIG. 17 is a high level block diagram of a computing system 1300 that can be used to implement various embodiments. In one example, computing system 1300 is a network system 1300. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a processing unit 1301 equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus. The bus may be one or more of any type of several bus architectures including a memory bus or memory controller, a peripheral bus or the like. Processing unit 1301 may be used to implement any of the computing devices described herein, such as remote devices 160, and/or hosts 112.

The CPU 1310 may comprise any type of electronic data processor. The CPU 1310 may be configured to implement any of the schemes described herein, such as the processes illustrated in FIGS. 4, 8, 11, 12, and 13 using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit interest packets and/or data packets in an ICN. Herein, the term "network interface" will be understood to include a port.

The processing unit 1301 may be configured to implement any of the schemes described herein, such as the processes 400, 420, 440, 500, 550 and 570, illustrated in FIG. 8, 9, 13, 14, 15 or 16 using any one or combination of steps described in the embodiments.

The components depicted in the computing system of FIG. 17 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The computer-readable non-transitory media includes all types of computer readable media, including magnetic storage media, optical storage media, and solid state storage media and specifically excludes signals. It should be understood that the software can be installed in and sold with a router, client, or other network device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

A computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A device, comprising:
    a memory storage comprising instructions; and
    one or more processors in communication with the memory, the one or more processors executing the instructions to:
        receive a networking service level agreement (SLA) associated with deploying a plurality of instances of computing services in a computing datacenter, the networking SLA specifying a bandwidth requirement between at least two instances;
        receive from a set of nodes in the datacenter a set of offers indicating initial network resources associated with the corresponding node;
        determine for the set of offers available network resources associated with meeting the SLA using the set of nodes;
        determine for each of the offers in the set of offers a distance between interconnected instances of the set of offers, the distances stored in a matrix associating available network resources between the interconnected instances;
        deploy the plurality of instances at a subset of nodes of the computing datacenter based on the available network resources associated with the set of offers, each offer in the set of offers from a corresponding node in the set of nodes including an indication of initial bandwidth available at the node;
        determine for the set of offers the available network resources by deducting the bandwidth requirement from the initial bandwidth at each corresponding node in the set of nodes;
        determine for the set of offers a remaining capacity of each link between interconnected pods after deducting the bandwidth requirement;
        generate an ordered list of the set of offers based on the distance and the remaining capacity of each link, the deploying the plurality of instances being based on the ordered list; and
        generate a score for each offer or subset of offers in the set offers, the score based on the distance between the interconnected pods and a cost representing network capacity to fulfill the networking SLA using the associated offer.

2. The device of claim 1, wherein:
    the subset of nodes is a second subset of nodes;
    the one or more processors execute the instructions to perform a first deployment of the plurality of instances at a first subset of nodes in the computing datacenter prior to determining the available network resources; and
    the one or more processors execute the instructions to deploy the plurality of instances at the second subset of nodes in the computing datacenter based on the available network resources after the first deployment, the second subset of nodes including at least one different node from the first subset of nodes.

3. The device of claim 2, wherein the one or more processors execute the instructions to:
    monitor the first deployment at the first subset of nodes to determine whether the networking SLA is satisfied; and
    wherein the plurality of instances are deployed at the second subset of nodes based on the first deployment not being satisfied.

4. The device of claim 1, wherein the one or more processors execute the instructions to:
    deploy a first QoS rule for enforcement across one or more pods;
    deploy a second QoS rule for enforcement across one or more virtual machines; and
    deploy a third QoS rule for enforcement across one or more physical machines.

5. The device of claim 1, wherein the one or more processors execute the instructions to:
    determine available virtual network resources between instances in one physical machine to meet the bandwidth requirement using each offer; and
    determine available physical network resources between instances in different physical machines to meet the bandwidth requirement using each offer.

6. The device of claim 1, wherein the one or more processors execute the instructions to:
    sort a plurality of offers, including the set of offers, based on the score for each offer or subset of offers; and
    evaluate the plurality of offers by evaluating lower score offers before higher score offers in order to select a number of offers for the set of offers that have enough network resources to meet the bandwidth requirement.

7. The device of claim 6, wherein:
    the networking SLA and the set of offers are received at a cloud management system;
    the one or more processors execute the instructions to transmit the plurality of offers to a service level agreement (SLA) system;
    the one or more processors execute the instructions to provide the ordered list from the SLA system to the cloud management system; and
    the plurality of instances are deployed by the cloud management system based on the ordered list.

8. The device of claim 7, wherein:
    the networking SLA specifies a latency requirement and a drop rate requirement;
    the ordered list is generated based on the latency requirement and the drop rate requirement;
    the one or more processors execute the instructions to receive a computing SLA associated with deploying the plurality of instances; and
    the one or more processors execute the instructions to deploy the plurality of instances based on the computing SLA and the ordered list.

9. The device of claim 1, wherein:
    the networking SLA is associated with deploying a plurality of containers, each container including one or more of the instances of computing services.

10. The device of claim 9, wherein:
    the networking SLA is associated with deploying a plurality of pods, each pod including two or more of the containers.

* * * * *